(12) United States Patent
Aoshima et al.

(10) Patent No.: US 6,381,409 B1
(45) Date of Patent: Apr. 30, 2002

(54) METHOD OF DISASSEMBLING LENS-FITTED PHOTO FILM UNIT AND DISASSEMBLING APPARATUS THEREFOR

(75) Inventors: Shinsuke Aoshima; Masaya Morita; Shoichi Uchida; Yoshihiro Tominaga, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/422,148

(22) Filed: Oct. 20, 1999

(30) Foreign Application Priority Data

| Oct. 20, 1998 | (JP) | 10-298410 |
| Oct. 20, 1998 | (JP) | 10-298411 |
| Oct. 27, 1998 | (JP) | 10-304848 |
| Oct. 27, 1998 | (JP) | 10-304849 |
| Jan. 12, 1999 | (JP) | 11-005064 |

(51) Int. Cl.[7] .............................................. G03B 17/02
(52) U.S. Cl. ........................................ 396/6; 396/429
(58) Field of Search ............................ 396/6, 429, 661

(56) References Cited

U.S. PATENT DOCUMENTS 5,615,395 A  *  3/1997  Komaki et al. ................ 396/6
5,646,712 A  *  7/1997  Solomon et al. ............. 156/344
5,758,197 A  *  5/1998  Cipolla et al. ................. 396/6
5,983,027 A  * 11/1999  Ichino et sal. ............. 396/535
6,153,042 A  * 11/2000  Tominaga ...................... 396/6

FOREIGN PATENT DOCUMENTS

| JP | 6-161042 | 6/1994 | ............ G03C/3/00 |
| JP | 10-62915 | 3/1998 | ............ G03C/3/00 |

* cited by examiner

Primary Examiner—David M. Gray
Assistant Examiner—Arthur A Smith
(74) Attorney, Agent, or Firm—Sughrue Mion, PLLC

(57) ABSTRACT

A method and apparatus for disassembling a used lens-fitted photo film unit whose unit body consists of a body base portion, front and rear cover sections removably engaged with the body base portion and with each other, and a label placed around the unit body. Access holes provided through the front and rear cover sections permit accessing internal engaging portions between the cover sections and the body base portion. The label is cut along joints between the front and rear cover sections by laser markers. Holes are pierced through the label to access holes of the unit body. Thereafter, disengaging tools are sequentially inserted into the access holes through the holes of the label, to disengage the internal engaging portions. Then, the front and rear cover sections are sequentially separated from the body base portion without removing the label from the front and rear cover sections.

23 Claims, 29 Drawing Sheets

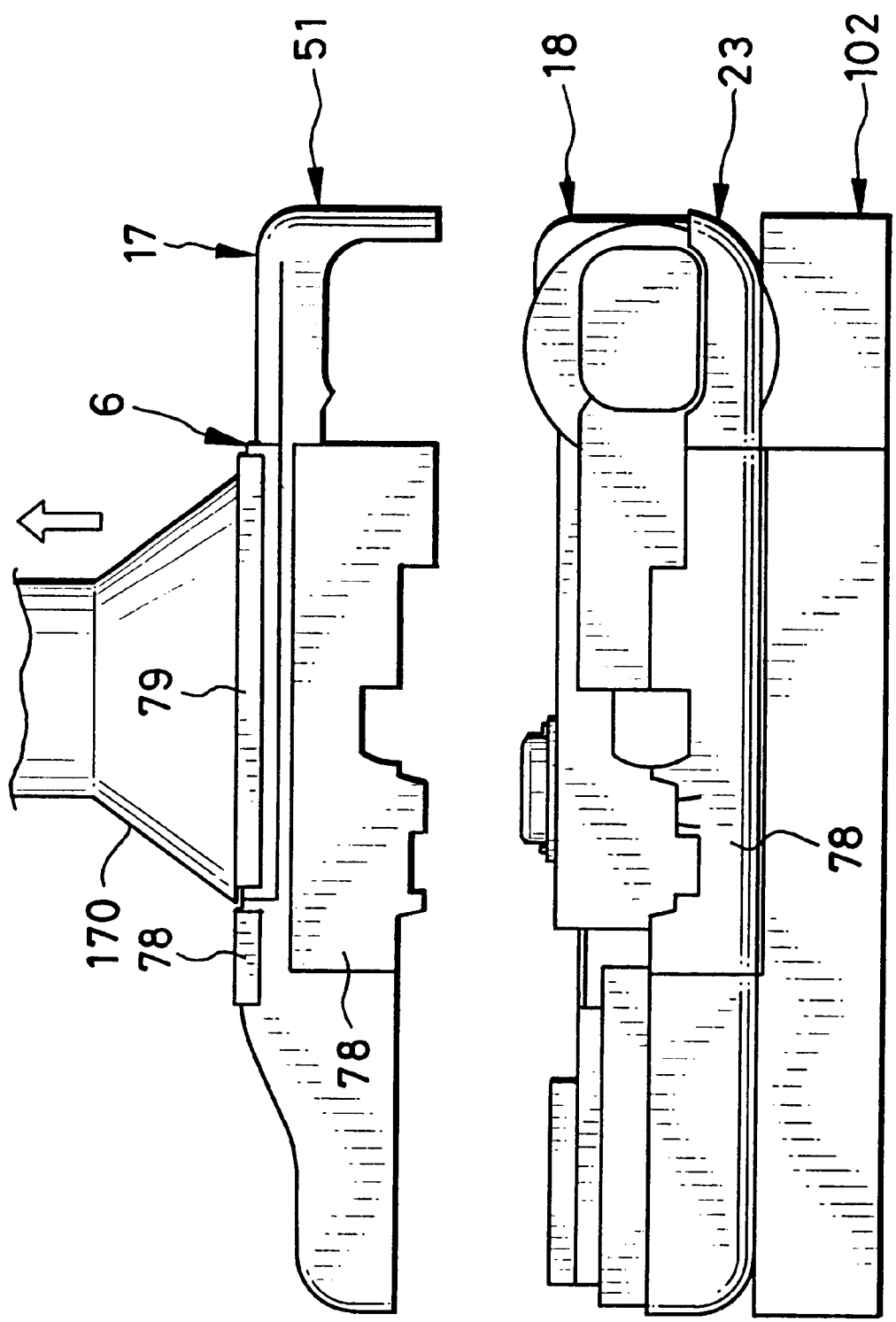

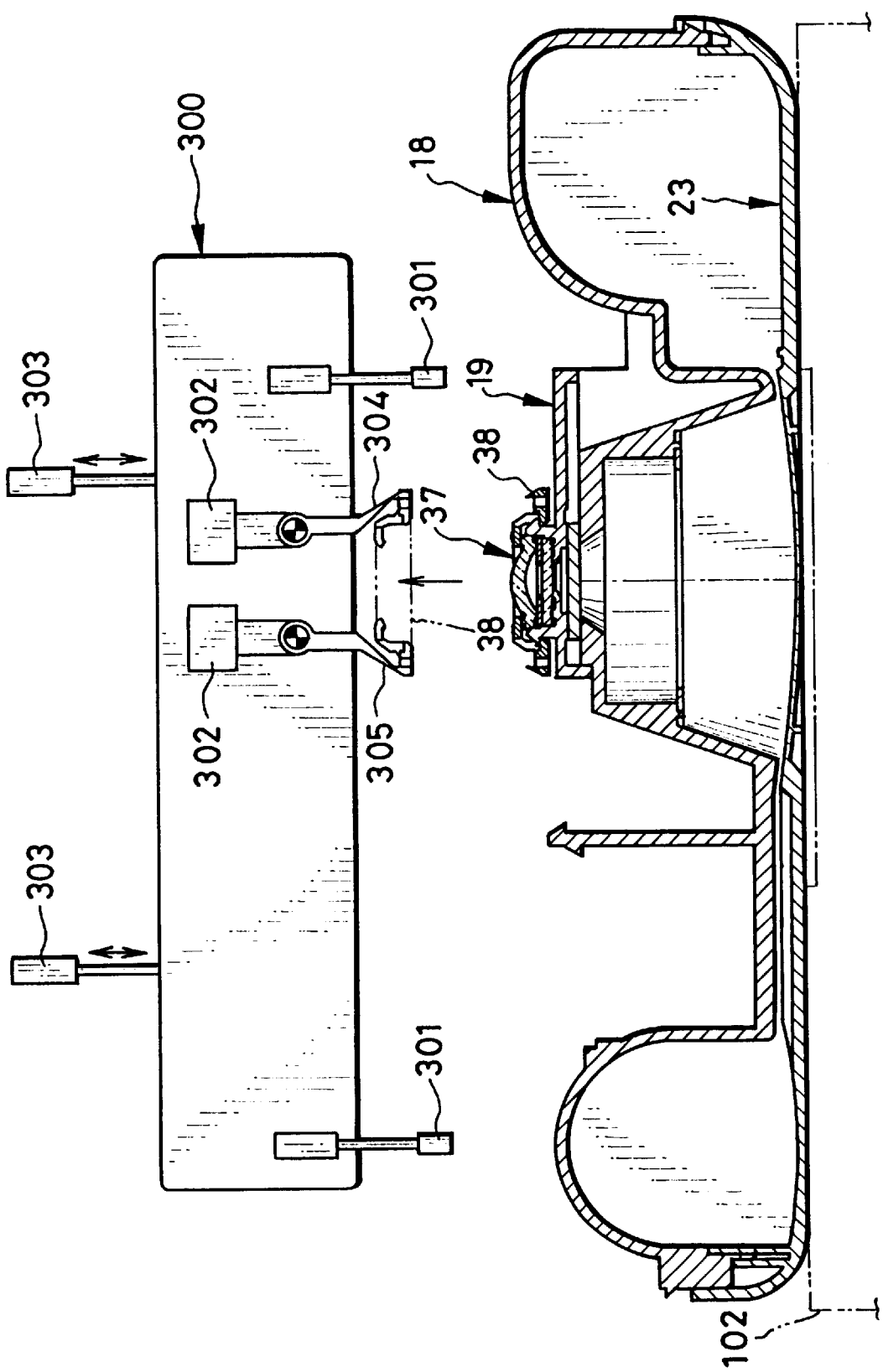

METHOD OF DISASSEMBLING LENS-FITTED PHOTO FILM UNIT AND DISASSEMBLING APPARATUS THEREFOR

BACKGROUND OF THE INVENTION

1. Field of the Invention

The present invention relates to a method of disassembling a lens-fitted photo film unit, and a disassembling apparatus therefor, by which the lens-fitted photo film unit is disassembled efficiently and economically in view of reusing respective parts.

2. Background Arts

Many types of lens-fitted photo film units, hereinafter referred to as the film units, have been known and widely sold in the markets. Recently, a film unit with a lens cover for protecting its taking lens from dusts and stains has been brought into the market. The film unit contains a roll of photo filmstrip therein and has simple photographic mechanisms incorporated thereinto. A unit body of the film unit consists of a body base portion pre-loaded with the filmstrip, and having the photographic mechanisms, including an exposure unit, mounted thereto, a front cover section covering the front side of the body base portion, and a rear cover section covering the rear side of the body base portion. An ornamental sheet made of paper or plastic is put around the unit body, for labeling as well as for covering up those openings which are unnecessary for using the film unit, but necessary for assembling or disassembling the film unit.

After the pre-loaded filmstrip is fully exposed, the whole film unit is forwarded to a photo finisher for development and printing. The photo finisher removes the exposed filmstrip from the unit body, and the emptied film unit is collected for recycling parts of the film unit.

In the recycling process, respective parts of the film unit are sorted into those parts which are to be reused as they are, and those to be reused as raw materials. For example, JPA 6-161042 discloses a disassembling method for the film units, wherein the film units are sorted according to the film unit type, and sent to an automatic disassembling line provided for each film unit type. To enable disassembling the film unit automatically, most parts of the film unit are coupled to one another through a snap-in engagement between a hook or hooks and a counterpart or counterparts. A claw is inserted into between the hook and its counterpart, and then moved to deform or bend the hook in a direction to release the engagement.

Among the disassembled parts, the exposure unit with a taking lens mounted thereon, a flash unit and other functional parts are reused as they are after inspecting their functions. Other parts, such as the front and rear cover sections and the body base portion, are reused as a raw material, since they are formed from the same plastic material.

The exposure unit removed from the body base portion is subjected to a lens cleaning process for cleaning the taking lens before being reused. For example, JPA 10-62915 discloses a lens cleaning process for the taking lens of the film unit. If the taking lens is scratched or deformed, the exposure unit cannot be reused just by cleaning it. Therefore, it is desirable to remove the taking lens from the exposure unit, and reuse the taking lens as a raw material.

It is easy to automatically remove the taking lens from the exposure unit when the taking lens is composed of a single lens element. However, where the taking lens is composed of front and rear lenses and a spacer disposed between the front and rear lenses, it is not so easy to remove the lens elements from the exposure unit. Especially where the spacer is formed from a different material from the front and rear lenses, it is necessary to remove them individually from the exposure unit. However, since the spacer has been tightly nipped between the lenses, and also these lens elements are plastic and thus tend to be charged with static electricity, they are likely to attract each other. So it is difficult to pick up them separately from each other. Moreover, when the spacer or the lens is removed along with another element of the taking lens, it may drop off before being collected, and may cause a trouble in the disassembling machine.

Before disassembling the film unit, the labeling and covering sheet has conventionally been peeled off from the unit body. However, since the sheet or label adheres to the unit body, it has been necessary to position a specific tool precisely, and move the tool slowly relative to the unit body, for peeling off the label. This process certainly lowers the speed and thus efficiency of the disassembling line.

To insert the disengaging tool into between the hook and the engaged counterpart, the hook must be accessible from the outside of the unit body. However, for the sake of fastening the front and rear cover sections securely to the body base portion, the unit body is often provided with a number of internal engaging portions which are located inside the unit body. In that case, it is hard to disassemble the unit body automatically.

Moreover, where the film unit is provided with the lens cover, and the lens cover must be removed from the front cover section to disassemble the film unit, the number of disassembling processes would be increased, and thus the cost of disassembling would be raised and the efficiency would be lowered.

SUMMARY OF THE INVENTION

In view of the foregoing, an object of the present invention is to provide a disassembling method and a disassembling apparatus, by which a film unit with a label around its unit body is efficiently disassembled.

Another object of the present invention is to provide a disassembling method and a disassembling apparatus, by which a film unit with a lens cover is efficiently disassembled.

Still another object of the present invention is to provide a disassembling method and a disassembling apparatus, by which a film unit with internal engaging portions is efficiently disassembled.

A further object of the present invention is to provide a disassembling method and a disassembling apparatus, by which a taking lens of a film unit is efficiently decomposed into individual lens elements, while sorting the lens elements.

According to the present invention, a method of disassembling a film unit that consists of a body base portion having photographic mechanisms incorporated therein, front and rear cover sections removably attached to front and rear sides of the body base portion and joined together to cover up the body base portion, and a label member put across a joint between the front and rear cover sections, is comprised of the steps cutting the label member along the joint between the front and rear cover sections; and separating the front or the rear cover section from the body base portion without removing the label member from the front or the rear cover section.

Since there is no need for peeling off the label member from the front or the rear cover section, the efficiency of disassembling the film unit is remarkably improved.

According to a preferred embodiment, laser beams are used for cutting the label member. It is preferable to use a laser marker for cutting the label member. The laser marker is disposed on the one side of a conveying path along which the film unit is conveyed in a predetermined posture, and the laser marker projects the laser beams toward the portion of the label member extending on the joint of the film unit on the conveying path. The laser marker may project the laser beams while the film unit moves along the conveying path. The film unit may be conveyed intermittently. In that case, the laser marker may project the laser beams toward the film unit while the film unit stops on the conveying path.

According to the present invention, a disassembling method for a film unit whose front cover section has a lens cover that is mounted on a front cover main body so as to be movable between a closed position covering a taking lens and an open position uncovering the taking lens, is comprised of the steps of providing first and second access holes respectively through the lens cover and the front cover main body when manufacturing them, such that the first and second access holes overlap each other in the closed position of the lens cover, to provide an access to an internal engaging portion between the front cover section and the body base portion; inserting a tool into the first and second access holes, to disengage the internal engaging portion between the front cover section and the body base portion; and separating the front cover section from the body base portion without separating the lens cover from the front cover main body.

Since it is not necessary to separate the lens cover from the front cover main body, the efficiency of disassembling the film unit is highly improved.

The present invention also provides a method of disassembling a film unit whose housing consists of at least two sections which are removably joined together through at least an engagement between an internal hook formed on a first one of the at least two sections and a counterpart formed on a second one of the at least two sections, the internal hook being located inside the film unit in proximity to an opening formed through the first section for the sake of exposing an operational member operated for photography, the method comprising the steps of positioning the film unit in a predetermined posture at a disassembling stage; inserting a tool into a gap between the opening and the operational member; breaking though a portion of the first section by the tool to connect the gap to outside the film unit, thereby to make the first section bendable in an area around the internal hook; pushing the area around the internal hook in a direction to disengage the internal hook from the counterpart; and thereafter separating the first and second sections from each other. The first section may be a rear cover section, a front cover section or another housing section of the film unit.

Instead of breaking through a portion adjacent to the gap, it is possible to deform by a tool an area of the first section around the internal hook in a direction to disengage the internal hook from the counterpart, to separate the first and second sections from each other.

According to the present invention, an apparatus of disassembling a film unit having a taking lens that consists of a front lens, a rear lens and a spacer disposed between the front and rear lenses, the spacer having an aperture at its center, wherein the front and rear lenses and the spacer are held in a lens holder and secured therein by a lens fastener that is fitted to a front of the lens holder through a snap-in engagement, the apparatus is comprised of a positioning device for positioning the film unit in a posture where the taking lens is oriented upward; a first suction nozzle being moved in the lens holder after the lens fastener is separated from the lens holder, to suck the front lens onto its face end, and then moved away from the lens holder to remove the front lens from the lens holder; a nozzle consisting of an internal tube that functions as an air jet nozzle and an external tube that surrounds the internal tube and functions as a suction nozzle, the nozzle being moved in the lens holder after the front lens is removed, to suck the spacer onto a face end of the external tube, and then moved away from the lens holder to remove the spacer from the lens holder, while air is blown out from the internal tube to remove the rear lens from the spacer; and a second suction nozzle being moved in the lens holder after the spacer is removed, to suck the rear lens onto a face end of the second suction nozzle, and then moved away from the lens holder to remove the rear lens from the lens holder.

In this way, the lens elements of the taking lens are individually removed from the lens holder.

According to a preferred embodiment, a chute connected to a suction device is inserted under the first suction nozzle after the first suction nozzle is moved away from the lens holder to remove the front lens. The suction device connected to the chute has a weaker sucking power than the first suction nozzle such that if the spacer is removed along with the front lens from the lens holder, only the spacer is sucked into the chute.

According to another preferred embodiment, an anti-static cleaner is put on the front of the lens holder and activated, after the lens fastener is removed and before the first suction nozzle is moved in the lens holder, for blowing anti-static air into the lens holder to eliminate anti-static electricity from the front and rear lenses and the spacer.

By eliminating the static-electricity from the lens elements of the taking lens, it comes to be easier to separate the lens elements from each other.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limiting the present invention, wherein like reference numerals designate like or corresponding parts throughout the several views, and wherein:

FIG. 23 is an explanatory diagram illustrating a position where a front cover separating mechanism separates the front cover section from the other parts of the unit body;

FIG. 24 is an explanatory diagram illustrating how a lens fastener separating mechanism separates a lens fastener of the taking lens from a lens holder;

DETAILED DESCRIPTION OF THE PREFERRED EMBODIMENT

Figure 1:
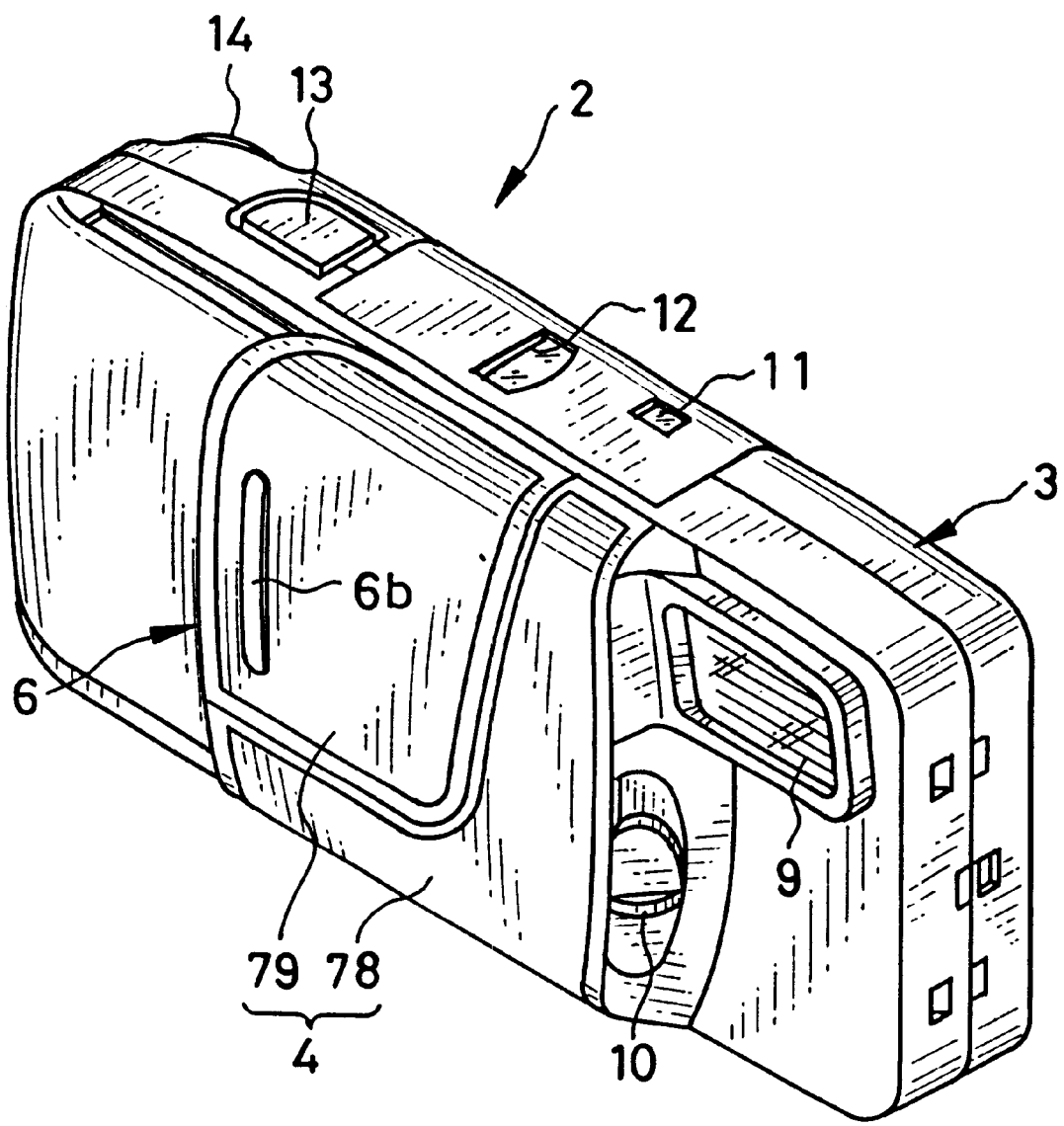
FIG. 1 is a front perspective view of an example of film unit in an inactive position, which is disassembled according to a disassembling method of the present invention.

FIG. 1 shows an example of film unit to be is assembled according to the method of the present invention. The film unit 2 consists of a unit body 3 and label members 4 that are put around the unit body 3. The unit body 3 has a simple exposure mechanism incorporated therein and contains a roll of unexposed filmstrip therein. The label members 4 have a trade name of the film unit 2, instructions and information on the film unit 2 printed thereon.

Figure 2:
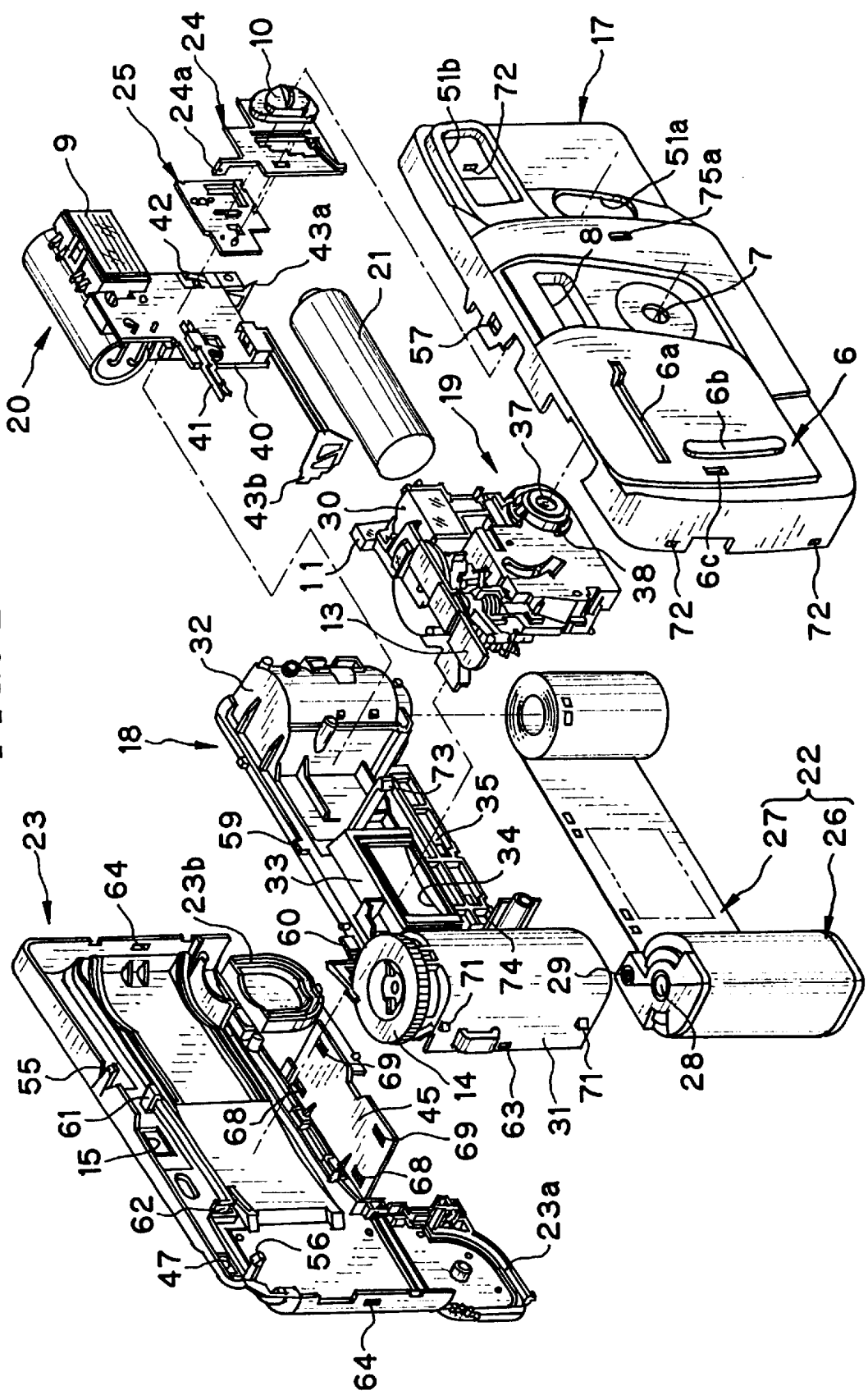
FIG. 2 is an exploded perspective view of a unit body of the film unit of FIG. 1.

A lens cover 6 is mounted slidable left and right on the front of the unit body 3. While the lens cover 6 is closed as shown in FIG. 1, the film unit 2 is inactive. By opening the lens cover 6 as shown in FIG. 2, a lens aperture 7 and a finder objective window 8 are uncovered. A flash projector 9 for projecting a strobe light toward a subject is located on an upper front corner of the unit body 3, and a flash operation knob 10 is provided to be slidable up and down below the flash projector 9. A light guide 11, a frame counter window 12, a shutter button 13 and a film winding wheel 14 are provided on the top side of the unit body 3. As shown in FIG. 2, a finder eyepiece window 15 is provided on the rear side of the unit body 3.

The unit body 3 is constituted of a front cover section 17, a body base portion 18, an exposure unit 19, a flash unit 20, a battery 21, a photo film cartridge 22, a rear cover section 23, a switch plate 24 having the flash operation knob 10 formed thereon, and a supporting plate 25 for supporting the switch plate 24 to be slidable on the front surface thereof. The photo film cartridge 22 is of IX 240 type, whose cartridge shell 26 has a spool 28 for winding a filmstrip 27 thereon and a light-shielding door member 29. The door member 29 is mounted rotatable about an axis parallel to the spool 28 inside a film port of the cartridge shell 26, so as to open or close the film port. Opposite ends of the door member 29 are exposed to the outside of the cartridge shell 26, so the door member 29 may be operated externally.

The body base portion 18 has a cartridge chamber 31 for holding the cartridge shell 26, a film chamber 32 for holding an unexposed roll of the filmstrip 27 that is withdrawn from the cartridge shell 26, and an exposure chamber 33 which are formed as an integral part. An exposure aperture 34 is formed on the rear side of the exposure chamber 33, and the exposure unit 19 is attached to the front of the exposure chamber 33. A battery chamber 35 for holding the battery 21 is provided below the exposure chamber 33.

The film winding wheel 14 is rotatably mounted on the top of the cartridge chamber 31, and a not-shown shaft of the film winding wheel 14 is engaged with the spool 28 of the cartridge shell 26. Responsive to a film winding operation, the filmstrip 27 is withdrawn from the film chamber 32, and is set behind the exposure aperture 34. Simultaneously, an exposed portion of the filmstrip 27 is wound up into the cartridge shell 26. Although it is not shown in the drawings, a door closing mechanism is provided in between the film winding wheel 14 and the top side of the cartridge chamber 31. The door closing mechanism closes the door member 29 when it detects from the rotational amount of the film winding wheel that the entire length of the filmstrip 27 has been wound up into the cartridge shell 26.

The exposure unit 19 is constituted of a taking lens 37, a finder optical system 30, the light guide 11, the shutter button 13 and other mechanisms necessary for photography, including a shutter release mechanism, a shutter charge mechanism, a film winding-stopping mechanism, and a frame counter mechanism.

Figure 3:
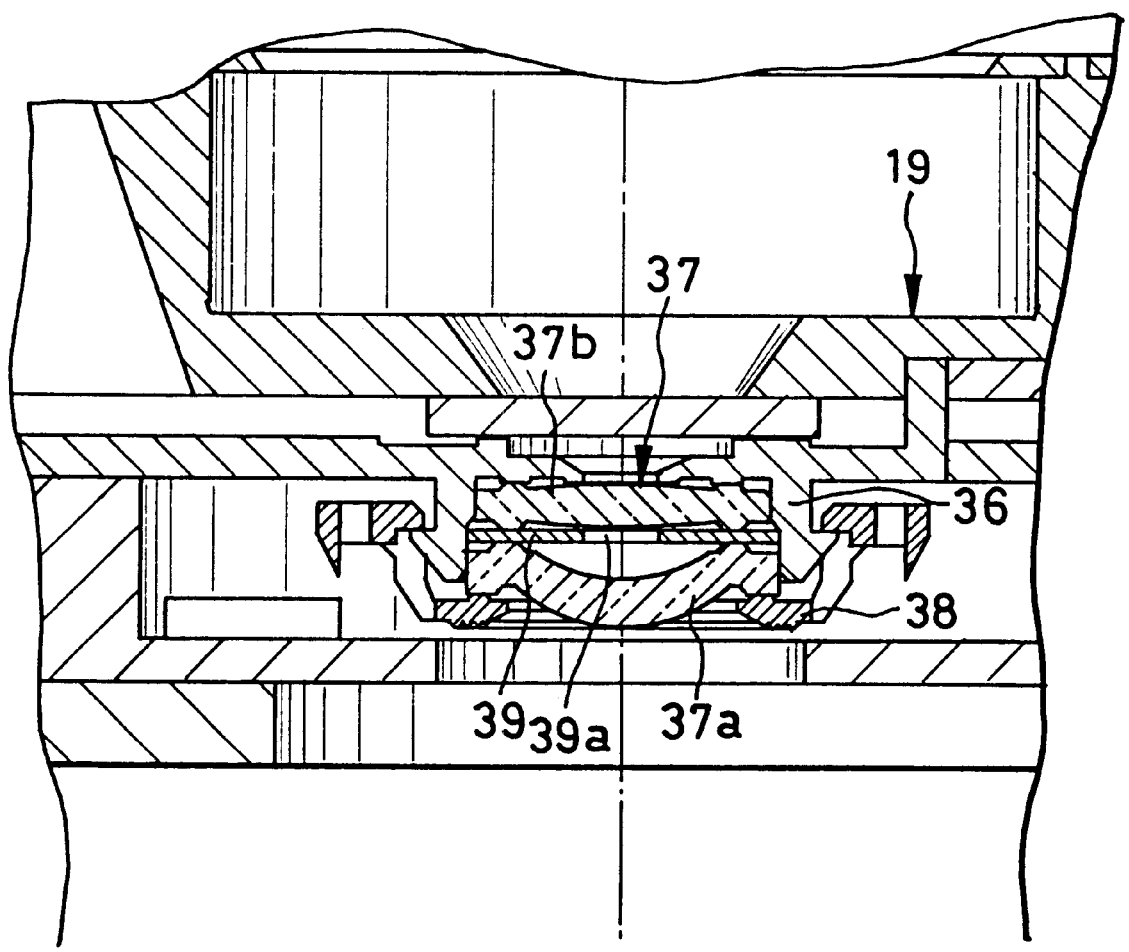
FIG. 3 is a fragmentary horizontal section of the film unit, illustrating a taking lens of the film unit.

As shown in detail in FIG. 3, the taking lens 37 is composed of a front lens 37a, a rear lens 37b, and a spacer 39 mounted in between the front and rear lenses 37a and 37b. The front and rear lenses 37a and 37b and the spacer 39 are put in a lens holder 36 that is formed on the front of the exposure unit 19, and are secured in the lens holder 36 by a lens fastener 38 that is force-fitted on the front of the lens holder 36 through a snap-in engagement. The spacer 39 is made of a plastic plate, and provides a predetermined spacing between the front and rear lenses 37a and 37b inside the lens holder 36. The spacer 39 has a stop aperture 39a, so it doubles as a stop plate. According to the present embodiment, the body base portion 18, the exposure unit 19 and the door closing mechanism are to be reused without being separated from each other, after the shutter button 13, the light guide 11, the lens fastener 38 and the taking lens 37 are removed from the exposure unit 19.

The flash unit 20 has a printed circuit board 40 having a flash circuit printed thereon. The flash projector 9, a synchronized trigger switch 41 that is turned on by the shutter release mechanism, a charge switch 42 that is turned on and off by sliding the flash operation knob 10 up and down, a pair of contact blades 43a and 43b for connecting the battery 21 to the flash circuit, and other elements of the flash circuit are mounted to the printed circuit board 40. According to the disassembling method of the present embodiment, the flash unit 20 is separated from the body base portion 18, and is subjected to an examination process and a cleaning process before being reused.

The rear cover section 23 is attached to the rear side of the body base portion 18 to cover up the rear and bottom sides of the body base portion 18. The rear cover section 23 is formed as an integral part from a plastic material, and has a pair of bottom lids 23a and 23b for closing the bottoms of the cartridge chamber 31 and the film chamber 32, and a battery chamber lid 45 for closing the bottom of the battery chamber 35. The bottom lids 23a and 23b are closed after the rear cover section 23 is attached to the body base portion 18, thereby closing the cartridge chamber 31 and the film chamber 32 in a light-tight fashion. The bottom lid 23a is opened at a photo-lab, to take the photo film cartridge 22 out of the cartridge chamber 31 after the entire length of filmstrip 27 is wound up into the cartridge shell 26.

Figure 4:
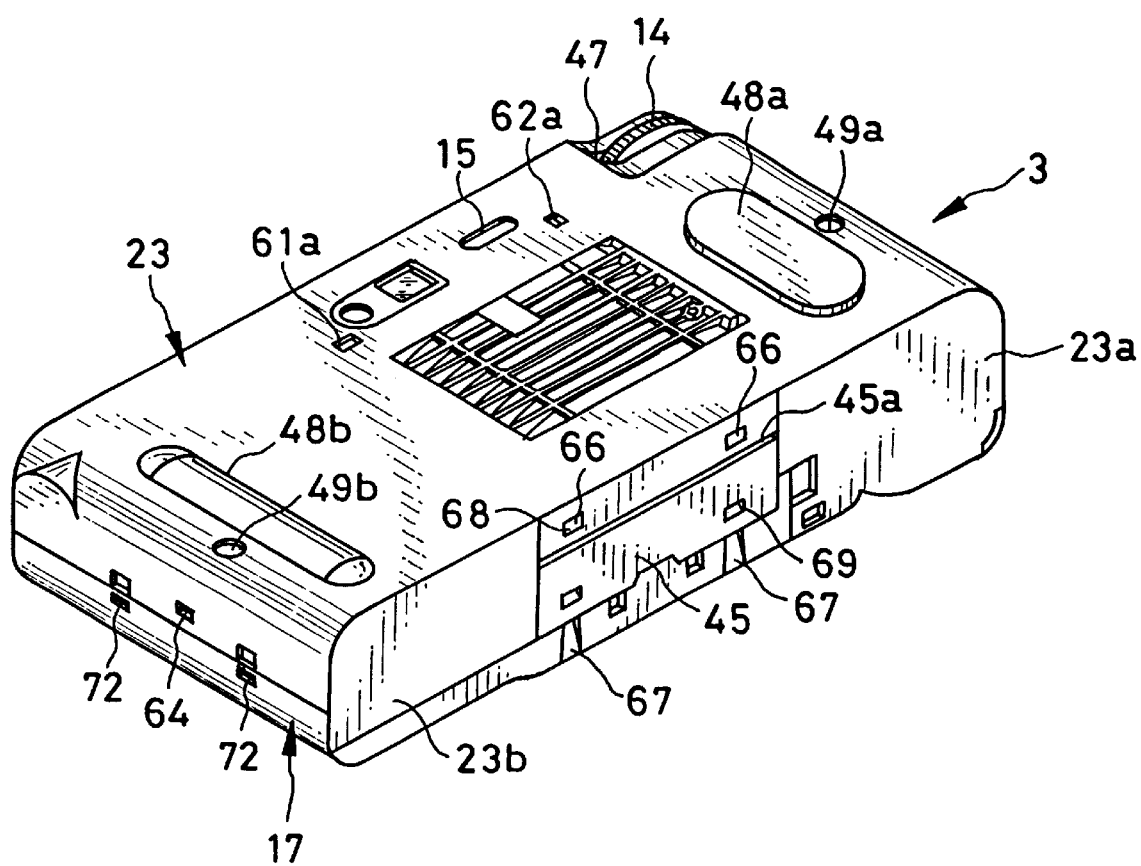
FIG. 4 is a rear perspective view of the film unit, showing the rear and bottom sides of the film unit.

As shown in FIG. 4, the rear cover section 23 has a slot 47 for exposing the film winding wheel 14, and a pair of finger holders 48a and 48b for stable gripping of the film unit 2. Positioning holes 49a and 49b are formed besides the finger holders 48a and 48b, for use in positioning the film unit 2 during the disassembling process. After being detached from the body base portion 18 in the disassembling process, the rear cover section 23 is crushed into pellets. The pellets are used as the material for forming rear cover sections 23.

Figure 5:
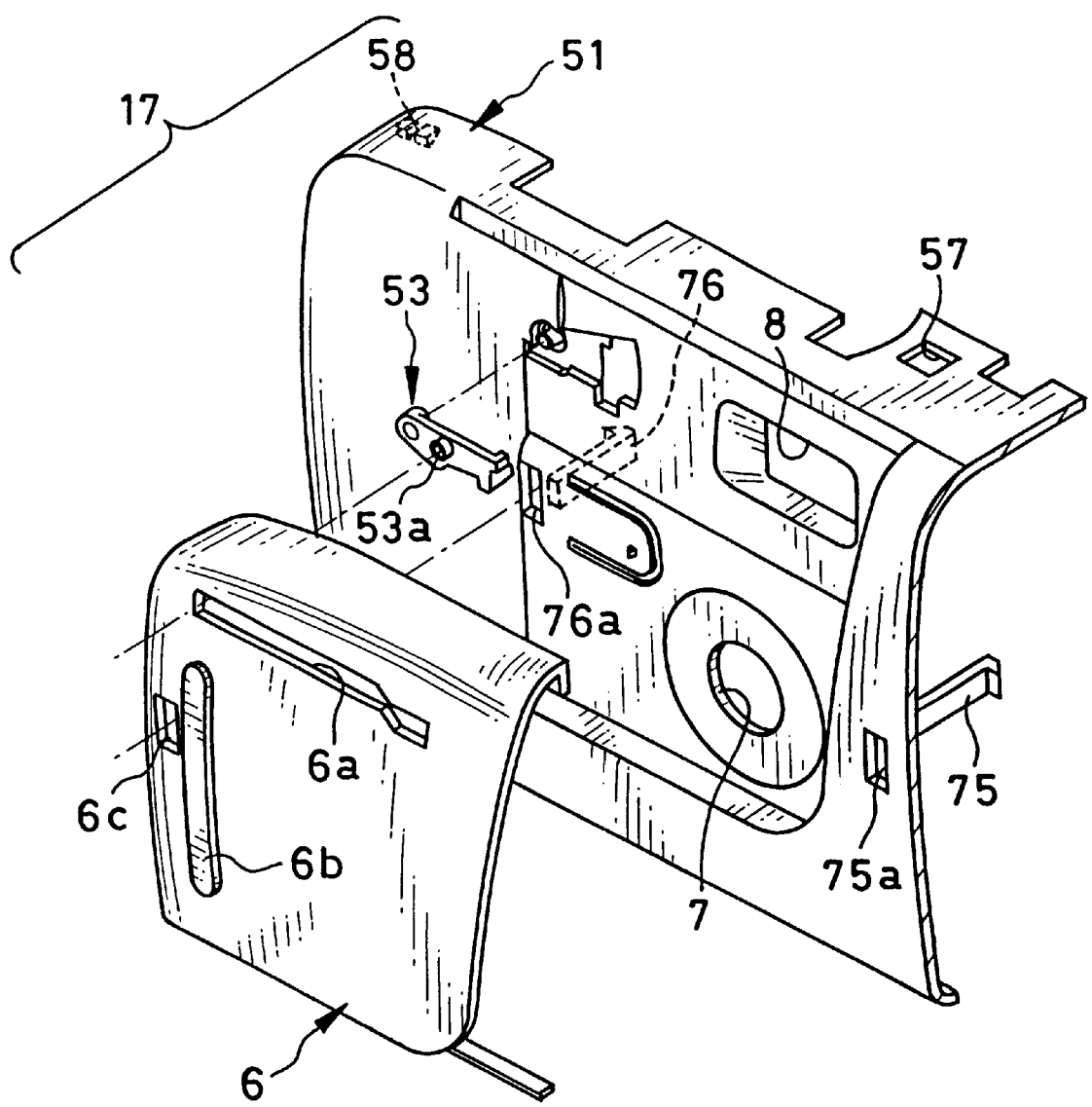
FIG. 5 is a fragmentary exploded perspective view of a front cover section of the film unit.

As shown in FIGS. 2 and 5, the front cover section 17 consists of a front cover main body 51 and the lens cover 6 that is mounted slidable on the front of the front cover main body 51. The lens aperture 7, the finder objective window 8, an opening 51a for exposing the flash operation knob 10, and a flash window 51b for exposing the flash projector 9 are formed through the front cover main body 51. A shutter lock lever 53 is mounted rotatably to the front of the front cover main body 51, for locking the shutter button 13 when the lens cover 6 is closed. The shutter lock lever 53 has a pin 53a that protrudes forward and is inserted in a slit 6a of the lens cover 6. The slit 6a bends at an intermediate position, so the shutter lock lever 53 rotates at the bent portion of the slit 6a while the lens cover 6 slides between the closed position and the open position. The bend of the slit 6a is located such that the shutter button 13 is locked unless the lens cover 6 is fully open. A finger holder 6b is formed on the front of the lens cover 6, to facilitate sliding the lens cover 6.

In the disassembling process, the front cover section 17 is removed from the body base portion 18. Since the front cover main body 51, the lens cover 6 and the shutter lock lever 53 are all formed from the same plastic material as the rear cover section 23, they are crushed altogether into pellets, and are recycled as the raw material for forming new front or rear cover sections.

The switch plate 24 and the supporting plate 25 are sandwiched between the flash unit 20 and the front cover main body 51. When the flash operation knob 10 and thus the switch plate 24 is slid upward, the switch plate 24 turns on the flash charge switch 42, to start charging the flash circuit. The switch plate 24 also has an engaging portion 24a that is engaged with the light guide 11 of the exposure unit 19. So the light guide 11 moves upward and protrudes upward from the film unit 2, as the flash operation knob 10 slides upward. Although it is omitted from the drawings, an LED is connected to the flash circuit so as to emit light when the flash circuit is charged up. The light guide 11 conducts the light from the LED to the outside of the film unit 2, indicating the completion of charging the flash circuit.

As shown in FIG. 2, hooks 55 and 56 are formed integrally on an upper middle portion and an upper left portion of the rear cover section 23 respectively. The hooks 55 and 56 protrude forward from the rear cover 23. The hook 55 is engaged in an engaging hole 57 that is formed through a top wall of the front cover main body 51. To facilitate inserting a disengaging tool into between the hook 55 and the engaging hole 57, the top surface of the hook 55 is recessed from the top surface of the top wall of the front cover main body 51.

Figure 6:
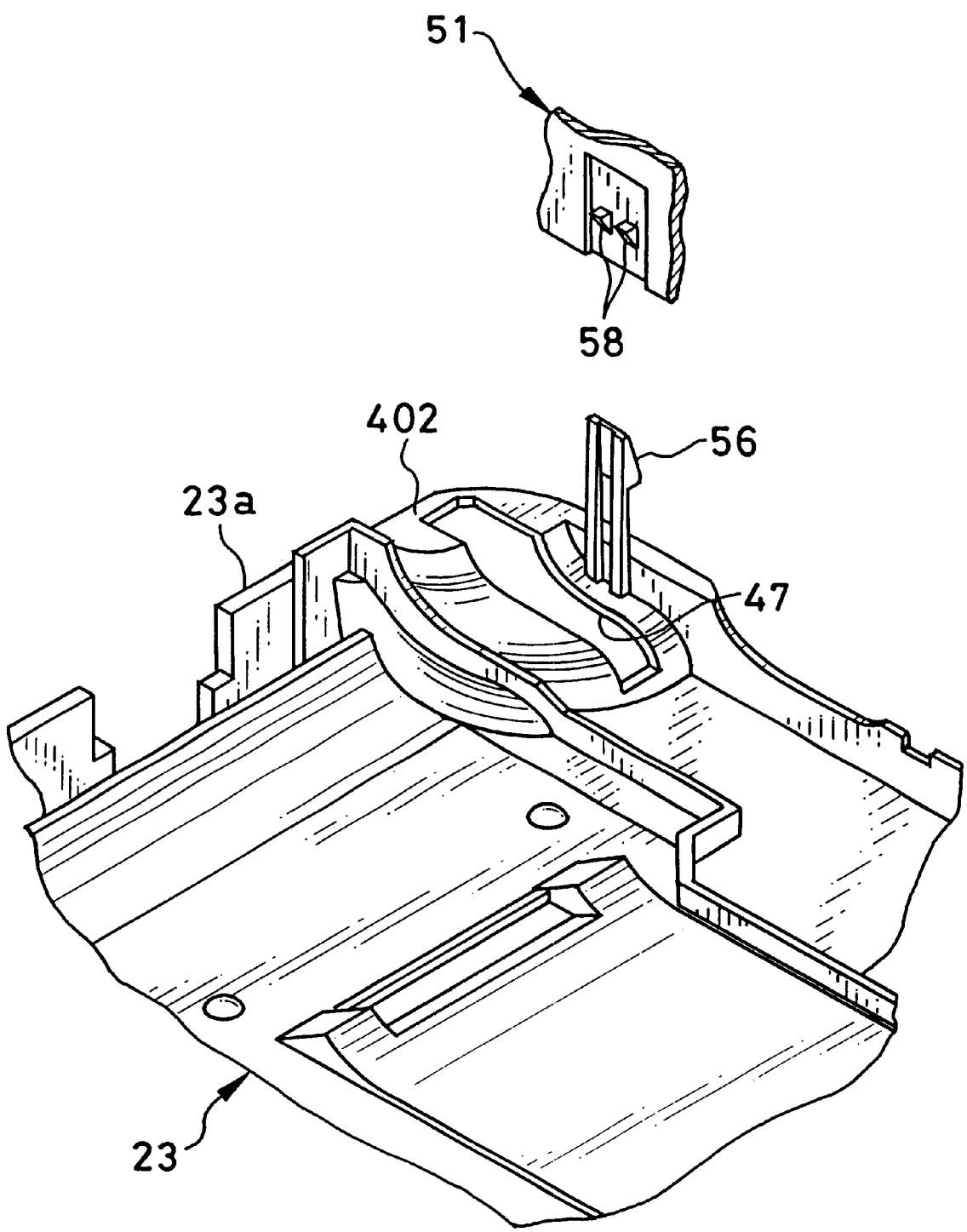
FIG. 6 is an explanatory diagram, illustrating a relationship between a hook formed on a rear cover section of the film unit and fastening claws formed on the front cover section.

As shown in detail in FIG. 6, the hook 56 is located above the slot 47 for the film winding wheel 14. The hook 56 is engaged with fastening claws 58 formed on an inside surface of the top wall of the front cover main body 51. In the assembled state of the film unit 2, the hook 56 and the fastening claws 58 are not exposed to the outside.

Referring back to FIG. 2, there are also hooks 61 and 62 formed on the inside of the rear cover section 23. The hooks 61 and 62 protrude forward, and are respectively engaged with projections 59 and 60 which are formed on the top side of the body base portion 18. As shown in FIG. 4, access holes 61a and 62a are formed through the rear cover section 23 at a root of each of the hooks 61 and 62. To disengage the hooks 61 and 62 from the projections 59 and 60, a tool is inserted into these access holes 61a and 62a.

The rear cover section 23 also has engaging holes 64 on opposite horizontal sides. The engaging holes 64 are fitted on claws 63 that are formed on opposite horizontal sides of the body base portion 18.

To disassemble the film unit 2, the battery chamber lid 45 is bent off the battery chamber 35 along a groove 45a (see FIG. 4) that is formed in the bottom surface of the battery chamber lid 45. As shown in FIGS. 2 and 4, the battery chamber lid 45 is also provided with two pairs of engaging holes 68 and 69, with which a pair of hooks 66 formed on the bottom of the body base portion 18 and a pair of hooks 67 formed on the bottom of the front cover main body 51 are respectively engaged. The hooks 67 are recessed from the bottom surface of the front cover main body 51, so as to facilitate inserting a disengaging tool into between the hooks 67 and the holes 69. The body base portion 18 further has a pair of claws 71 on either horizontal sides, and the front cover main body 17 has a pair of engaging holes 72 on either horizontal sides to engage with the claws 71.

As shown in FIG. 5, the front cover main body 17 further has hooks 75 and 76 that protrude rearward from the inside surface of the front wall of the front cover main body 17. The hooks 75 and 76 are engaged with engaging projections 73 and 74 that protrude forward from the front of the body base portion 18. Access holes 75a and 76a are formed at the roots of the hooks 75 and 76, for allowing to insert a tool to disengage the hooks 75 and 76 from the engaging projections 73 and 74. Also, the lens cover 6 has an access hole 6c that is aligned with the access hole 76a when the lens cover 6 is closed. So the tool may access the hook 76 from the outside of the unit body 3 through the access holes 6c and 76a in order to disengage the hook 76 from the hook 74. That is, the front cover section 17 may be detached from the body base portion 18 without the need for removing the lens cover 6 from the front cover main body 51. The access hole 6c needs not to be precisely aligned with the access hole 76a in the closed position of the lens cover 6. The access hole 6c may be staggered a little from the access hole 76a so far as it is possible to insert the tool into the access hole 76a through the access hole 6c just by sliding the lens cover 6 a little in the opening direction.

The access holes 6c, 75a, 61a and 62a, the engaging holes 57, 68 and 69, and the hooks 55, 66 and 67 are covered up with the label members 4 in the complete film unit 2.

Figure 7:
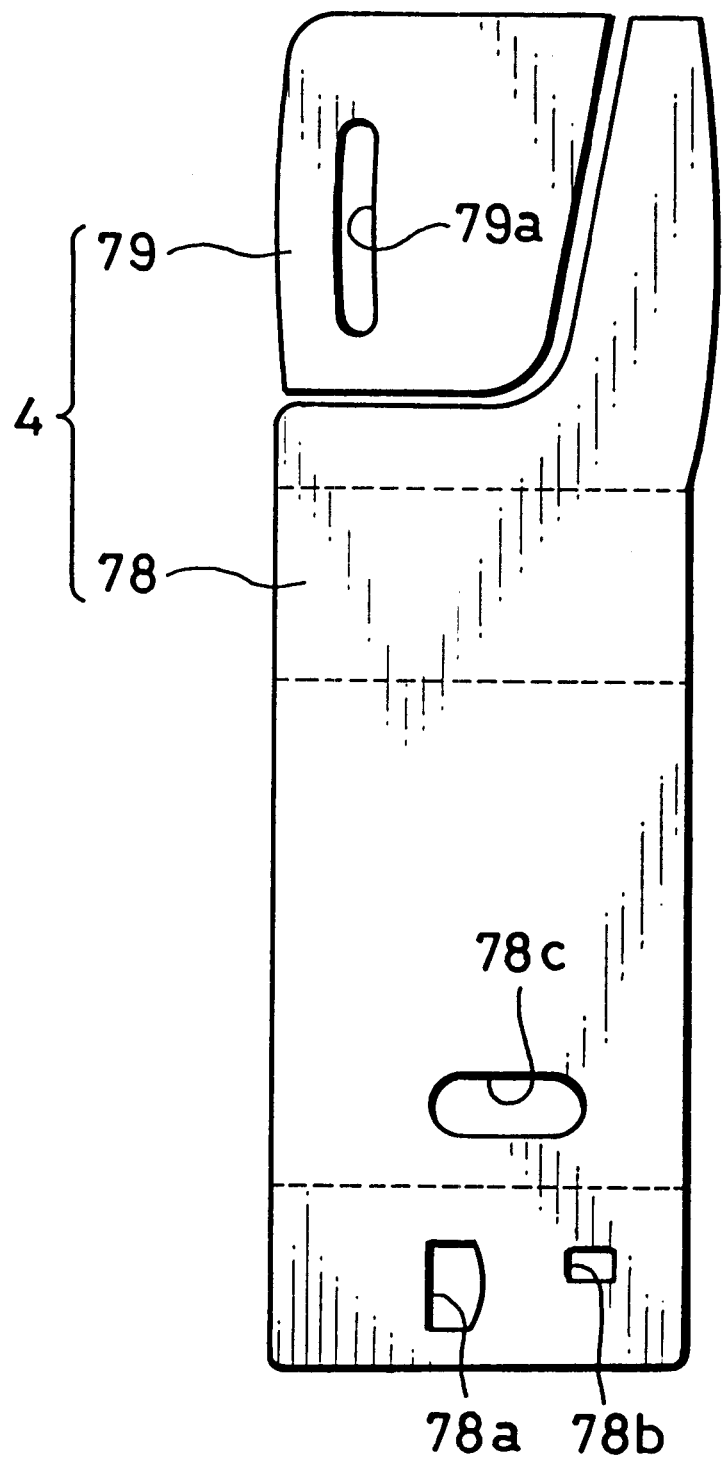
FIG. 7 is an unfolded view of label members to be put around the unit body of the film unit.

As shown in FIG. 7, the label members 4 consist of a main label member 78 and a sub label member 79. The main label member 78 is wrapped around a middle zone of the unit body 3 except the lens cover 6, and secured to the unit body 3 by adhesion. The sub label member 79 adheres to the front of the lens cover 6. The main label member 78 is formed with openings 78a, 78b and 78c for exposing the frame counter window 12, the light guide 11 and the eyepiece window 15 respectively. The sub label member 79 is formed with an opening 79a for exposing the finger holder 6b on the lens cover 6. The label members 4 uses a plastic film as a base sheet, which is solvable with the plastic material used for forming the front cover section 17 and the rear cover section 23. So the label members 4 may be crushed together with the front cover section 17 and the rear cover section 23, to reuse as the raw material.

Figure 8:
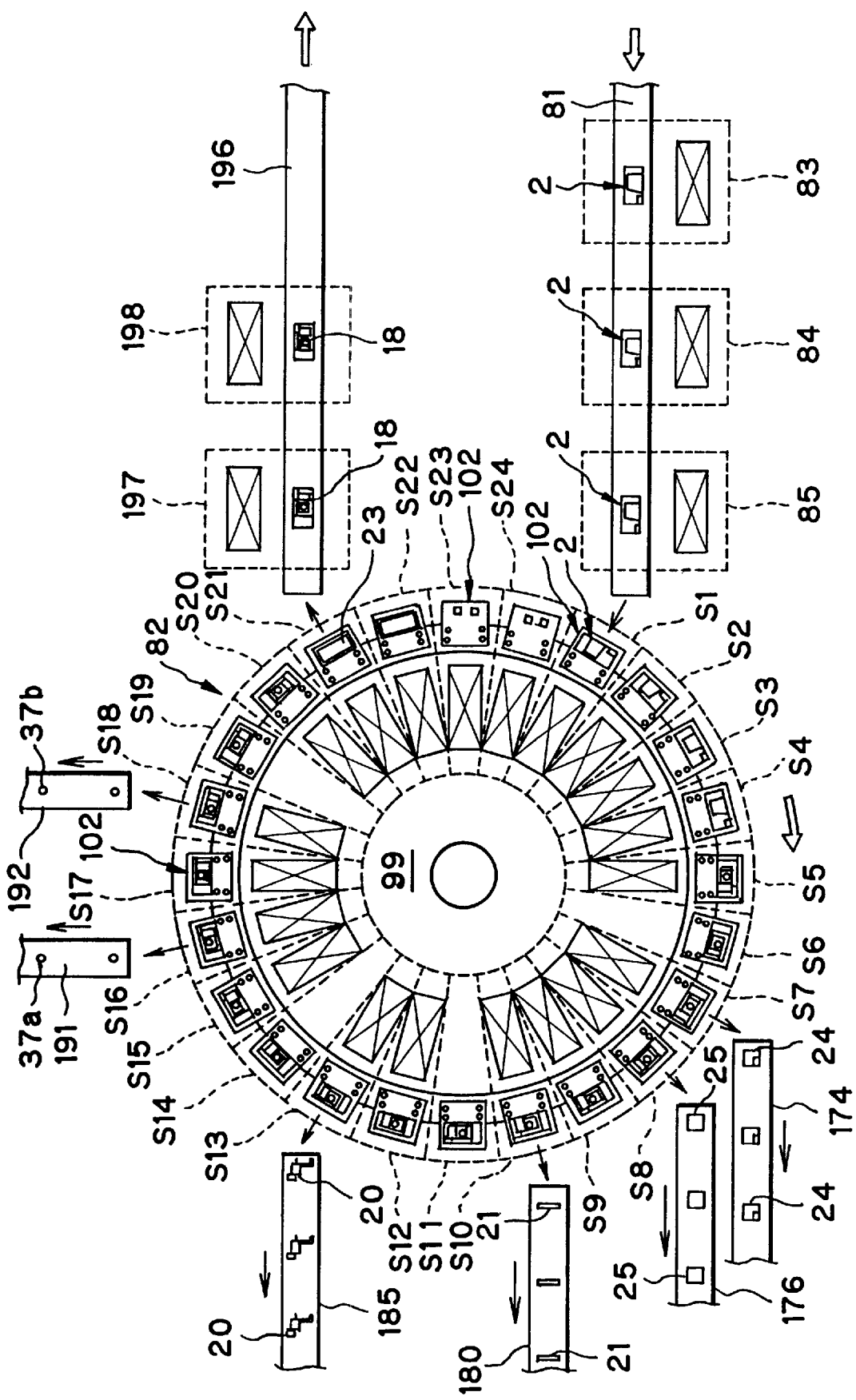
FIG. 8 is a schematic diagram illustrating a disassembling apparatus according to an embodiment of the present invention.

FIG. 8 shows a disassembling apparatus for the film unit 2. The film units 2, after having the exposed photo film cartridges 22 removed therefrom, are collected from photo-labs, and are sorted according to the film unit type. Then, the film units 2 are successively conveyed on a conveyer 81 to a turn table 82. As shown in detail in FIG. 9, the film units 2 are aligned in the same posture on the conveyer 81, i.e., with their front side up and their top side oriented leftward in the conveying direction of the conveyer 81. Along the conveyer 81, there are provided a work inspecting section 83, a disqualified work ejecting section 84 and a label cutting section 85. The work inspecting section 83 photographs each film unit 2 on the conveyer 81, and checks by an image processing whether there are any superficial defects on the film unit 2, whether the type as well as the posture of the film unit is right, and also whether the lens cover 6 is closed or not.

According to the results of the inspections in the work inspecting section 83, those film units 2 having some superficial defects, those conveyed in a wrong posture, those of different types, and those with their lens covers 6 open are ejected by being pushed out of the conveyer 81 by an air cylinder or the like in the disqualified work ejecting section 84.

Figure 9:
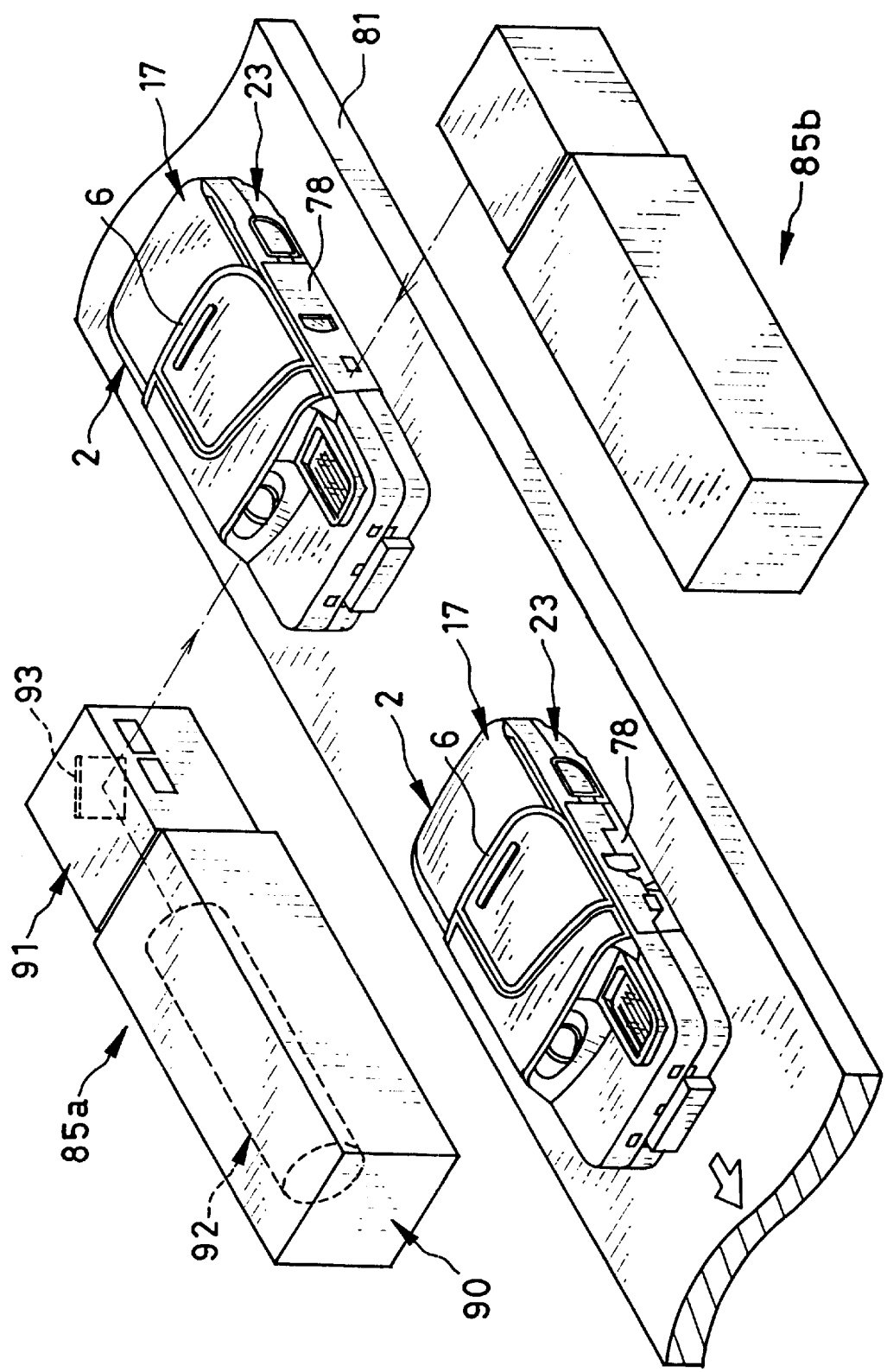
FIG. 9 is a schematic diagram illustrating a label cutting section of the disassembling apparatus of FIG. 8.

FIG. 9 shows the label cutting section 85. The label cutting section 85 consists of a pair of laser markers 85a and 85b, which are located on opposite sides of the conveyer 81.

The laser markers 85a and 85b are usually used for providing letters or marks on labels or packaging materials, but they can be used to cut paper or plastic sheets like the label members 4 by rising the intensity of laser beams 92a or elongating the time of irradiation.

The laser marker 85a consists of a box-shaped main body 90, and a head portion 91 disposed on one end of the main body 90. The main body 90 accommodates a laser generator 92, and the head portion 91 accommodates a mirror 93 for reflecting the laser beams 92a from the laser generator 92 toward the film unit 2 on the conveyer 81. The mirror 93 can change the angle to the laser beams 92a from the laser generator, thereby to change the projecting direction of the reflected laser beams 92a. The angle of the mirror 93 is adjusted by a not-shown mirror swinging mechanism under a control of a not-shown controller. The laser marker 85b has the same construction as the laser marker 85a.

Figure 10:
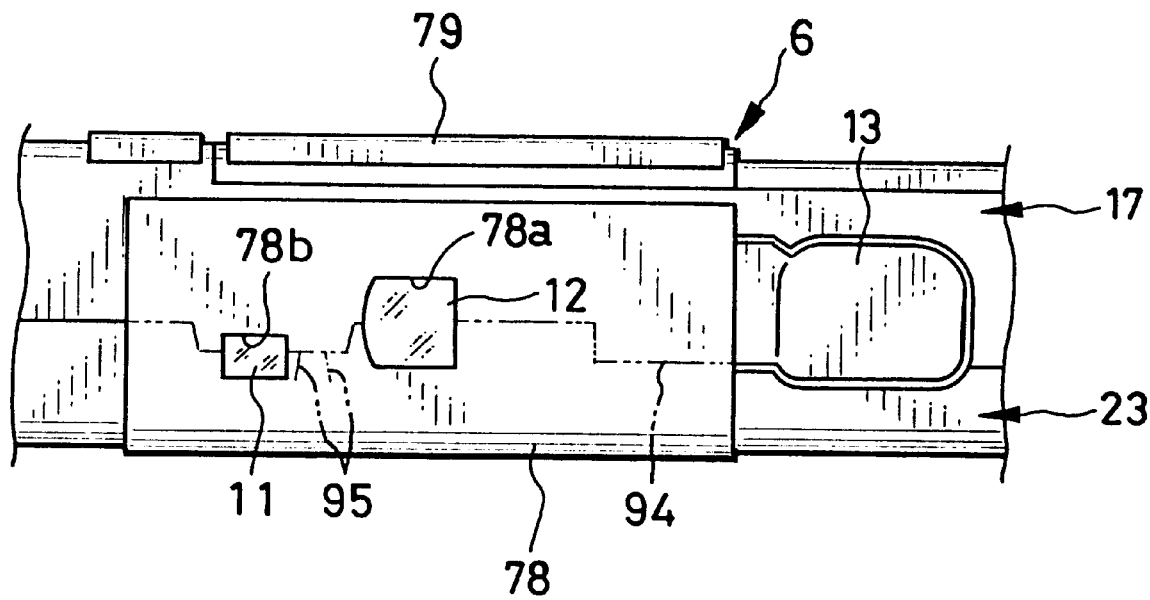
FIG. 10 is an explanatory diagram illustrating how the label member is cut on a top side of the unit body.

As shown in FIG. 10, the laser marker 85b cuts the main label member 78 along a cutting line 94, that extends on a top side joint between the front cover section 17 and the rear cover section 23. The laser marker 85b also cuts the main label member 78 along cutting lines 95 that correspond to side edges of the hook 55 formed on the rear cover section 23. The cutting lines 95 make it easier to insert the tool into between the hook 55 and the front cover section 17 to disengage the hook 55 from the engaging hole 57.

Figure 11:
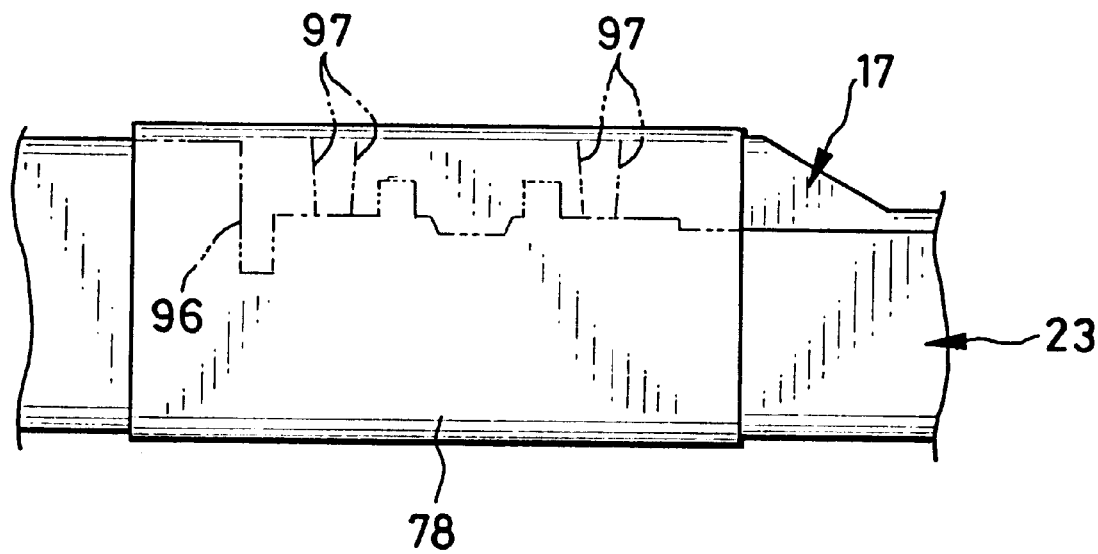
FIG. 11 is an explanatory diagram illustrating how the label member is cut on a bottom side of the unit body.

On the other hand, as shown in FIG. 11, the laser marker 85a cuts the main label member 78 along a cutting line 96 that extends on a bottom side joint between the front cover section 17 and the rear cover section 23. The laser marker 85a also cuts the main label member 78 along cutting lines 97 that correspond to side edges of the hooks 67 formed on the bottom of the front cover section 17. The cutting lines 97 make it easier to insert the tool into between the hooks 67 and the battery chamber lid 45 to disengage the hooks 67 from the engaging holes 69. In this way, even though the shapes of the joints between the front cover section 17 and the rear cover section 23 are complicated, the laser markers 85a and 85b cut the main label member 78 along the joints with ease at a high speed.

It is preferable to taper one or both of mating edges of the front cover main body 51 and the rear cover section 23 at the top and bottom joints corresponding to the cutting lines 94 and 96. Thereby, the laser beams 92a are prevented from being reflected from the top and bottom surfaces of the front cover main body 51 and the rear cover section 23.

The turn table 82 has twenty-four stages S1 to S22 arranged at regular intervals around the turn table 82, and twenty-four pallets 102 are fixedly mounted on the turn table 82 at regular intervals around the circumferential area of the turn table 82. The turn table 82 turns intermittently to stop each pallet 102 seriatim at each of the stages S1 to S22. The film units 2 conveyed on the conveyer 81 are placed one by one on ttie pallets 102 at the first stage S1, so the conveyer 81 moves intermittently in synchronism with the stepwise rotation of the turn table 82. The turn table 82 is supported on a stationary base table 99 so as to be rotatable around the base table 99. Many devices for disassembling the film unit 2 are disposed on the base table 99, such that the disassembling devices act on the film units 2 while the pallets 102 bearing the film units 2 stop at those stages allocated to the respective disassembling devices.

Figure 12:
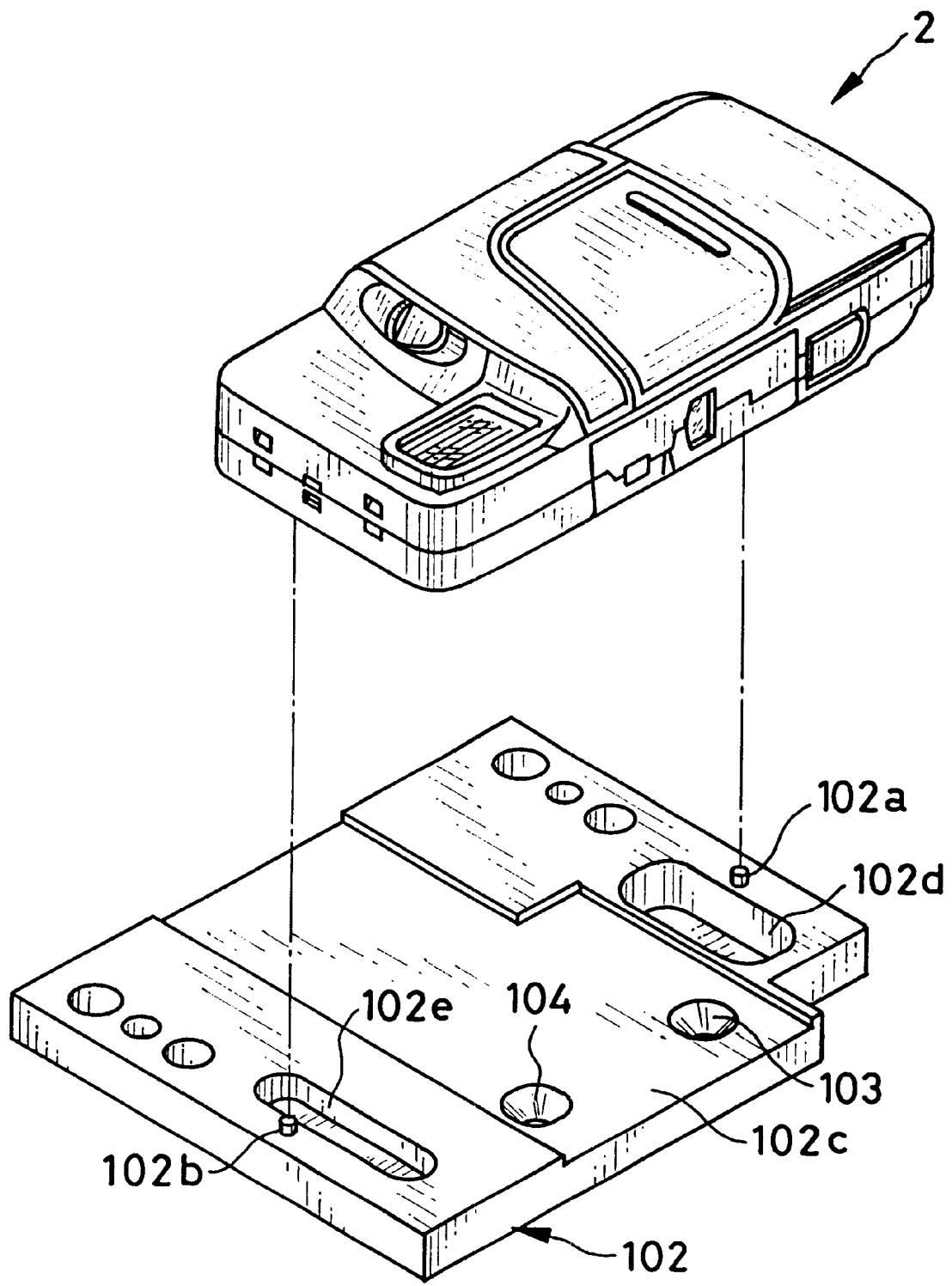
FIG. 12 is a perspective view of a pallet for carrying the film unit.

The first stage S1 is to pick up the film unit 2 from the conveyer 81 and place it on the pallet 102. For this purpose, a pick-and-place (P&P) device, so-called a robot hand, is disposed in the first stage S1 . As shown in FIG. 12, the pallet 102 is made of a metal blade, and has a pair of positioning pins 102a and 102b, which protrude upward and are inserted in the positioning holes 49a and 49b of the rear cover section 23 of the film unit 2. A recess 102c is provided in a middle area of the top side of the pallet 102, so the main label member 78 of the film unit 2 may not contact the pallet 102. Otherwise, because of the weight of the unit body 3, the main label member 78 would be pressed onto the rear cover section 23 by the pallet 102, and would adhere too much to the rear cover section 23. The pallet 102 further has relief cavities 102d and 102e for accepting the finger holders 48a and 48b, so the film unit 2 is held horizontal on the pallet 102. The pallet 102 also has access openings 103 and 104, through which the disassembling tools are inserted into the engaging portions provided on the rear side of the film unit 2.

At the second stage 52, holes are formed at predetermined positions of the label members 4, i.e., where the access holes 6c and 75a of the front cover section 17 and the access holes 61a and 62a of the rear cover section 23 are located behind. This is because the label members 4 as using a plastic film base is so stiff that it is difficult for the disengaging tools to thrust through the label members 4 into those engaged portions of the unit body 3. By perforating the label members 4 beforehand, the disengaging tools can easily thrust through the label members 4. Thereby, the life span of the disengaging tools are also elongated.

Figure 13:
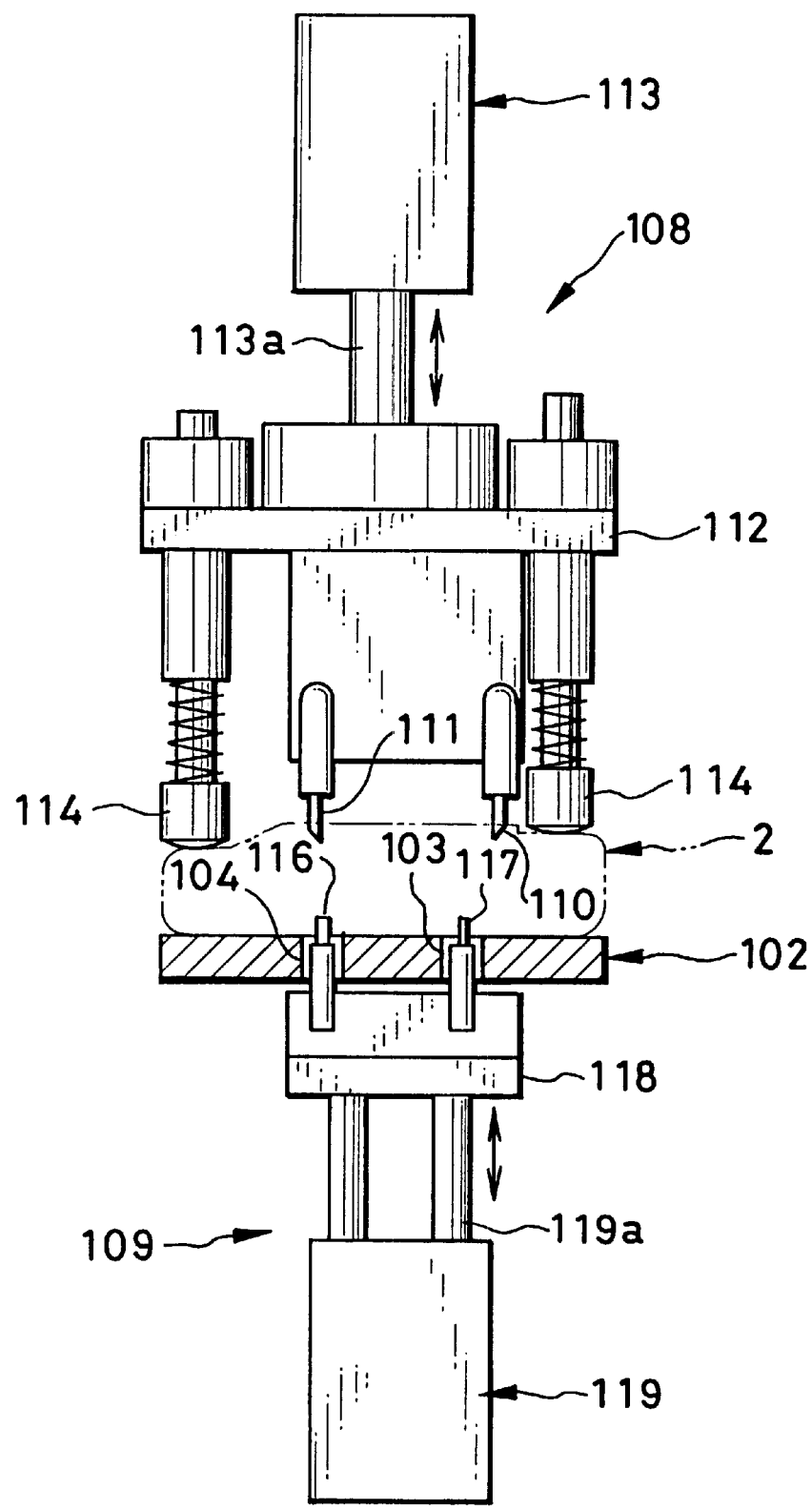
FIG. 13 is a schematic diagram illustrating a hole-making device.

FIG. 13 shows a hole-making device for providing holes through the label members 4 at the second stage S2, which consists of an upper mechanism 108 located above the pallet 102 and a lower mechanism 109 located below the pallet 102. The upper mechanism 108 is constituted of piercing tools 110 and 111 that are opposed to the access holes 6c and 75a, and a base plate 112 for holding the piercing tools 110 and 111, and an air cylinder 113 for moving the holding plate 112 up and down. The base plate 112 is further provided with a pair of work holding arms 114 for holding the film unit 2 onto the pallet 102.

Figure 14:
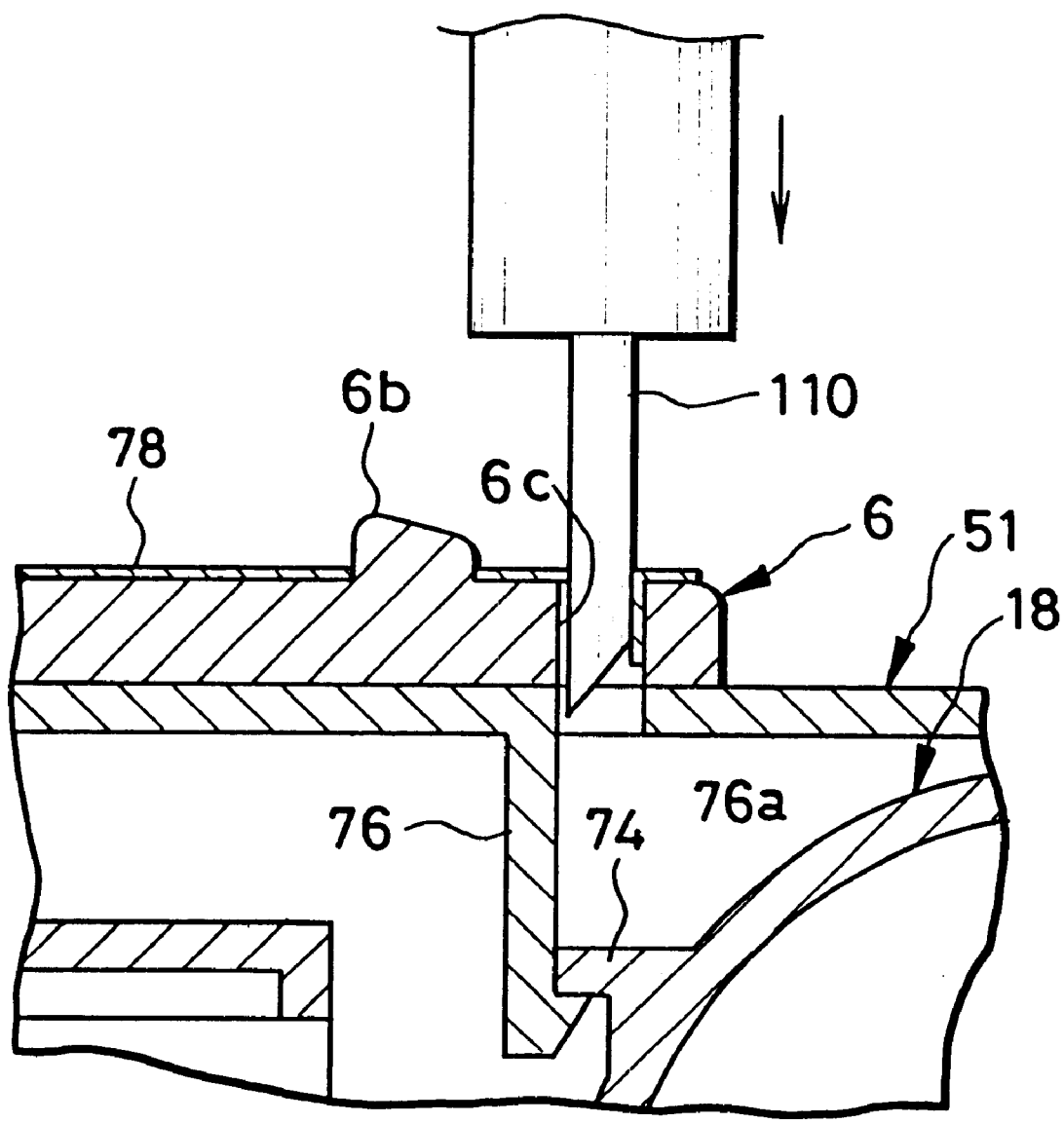
FIG. 14 is an explanatory diagram illustrating a position where a piercing tool of the hole-making device makes a hole in the label.

When the air cylinder 113 is activated, a plunger 113a protrudes downward, so the base plate 112 and thus the piercing tools 110 and 111 as well as the work holding arms 114 move down. Thereby, the work holding arms 114 press the film unit 2 onto the pallet 102, and the piercing tool 110 thrusts through the sub label member 79 to form a hole in opposition to the access hole 6c, as shown in FIG. 14. Simultaneously, the piercing tool 111 thrusts through the main label member 78 to form a hole in opposition to the access hole 75a.

The lower mechanism 109 is constituted of piercing tools 116 and 117, a base plate 118 for holding the piercing tools 116 and 117, and an air cylinder 119 for moving the base plate 118 up and down along slide member 119a in the same way as the upper mechanism 108, except that it has not any members like the work holding arms 114. The piercing tools 116 and 117 are moved up into the access openings 103 and 104 of the pallet 102, and thrust through the main label member 78 to form holes in opposition to the access holes 61a and 62a of the rear cover section 23. It is to be noted that the piercing tools 110, 111, 116 and 117 are provided with an anti-adhesion coating, so that the label members 4 may not adhere to these tools 110, 111, 116 and 117.

Figure 15:
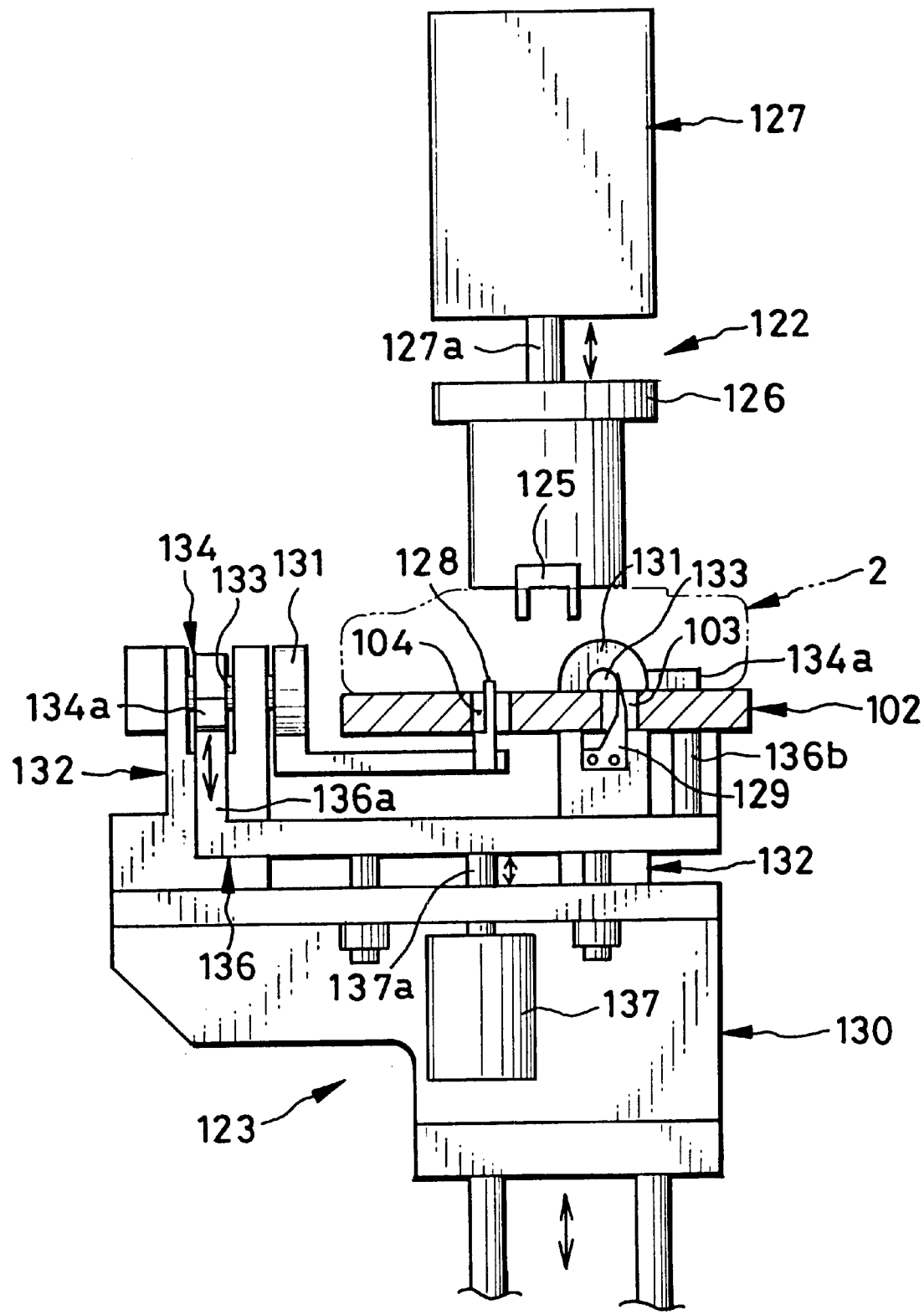
FIG. 15 is a schematic diagram illustrating a battery chamber lid opening mechanism and a rear cover disengaging mechanism.

At the third stage S3 are disposed a battery chamber lid opening mechanism 122 for opening the battery chamber lid 45 and a rear cover disengaging mechanism 123 for disengaging the hooks 61 and 62 from the projections 59 and 60. As shown in FIG. 15, the battery chamber lid opening mechanism 122 is disposed above the pallet 102, whereas the rear cover disengaging mechanism 123 is disposed below the pallet 102.

Figure 16A:
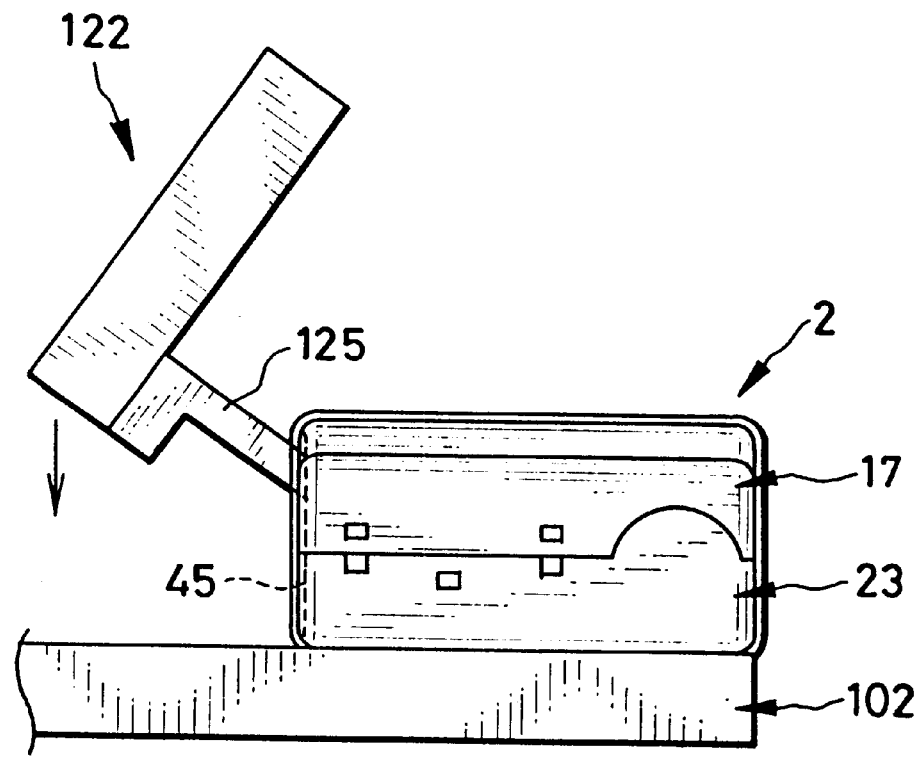
FIGS. 16A and 16B are explanatory diagrams illustrating how the battery chamber lid opening mechanism works.

The battery chamber lid opening mechanism 122 is constituted of a forked arm 125, a base plate 126 for holding the forked arm 125, and an air cylinder 127 for moving the base plate 126 up and down. When the air cylinder 127 is activated, a plunger 127a protrudes downward to move down the base plate 126. So the forked arm 125 slides down along the hooks 67 that are formed on the bottom of the front cover main body 51, and come to contact with the edge of the battery chamber lid 45, as shown in FIG. 16A. As the base plate 126 further moves downward, the forked arm 125 pushes the battery chamber lid 45 to bend it along the groove 45a, opening the battery chamber 35.

The rear cover disengaging mechanism 123 has a pair of disengaging tools 128 and 129 that are inserted into the access holes 61a and 62a of the film unit 2 through the holes of the label members 4 formed at the second stage 106. Each of the disengaging tools 128 and 129 is held in a bracket 131, and the bracket 131 is securely mounted on an axle 133 that is pivotally supported by a bearing section 132. The bracket 131, the axle 133 and the bearing section 132 for the disengaging tool 129 are constructed similarly to those for the disengaging tool 128, but they are oriented orthogonal to each other. The bearing sections 132 are mounted on a base portion 130, and the base portion 130 is movable up and down by a not-shown air cylinder. A cam ring 134 with a cam projection 134a is securely mounted on the axle 133.

The disengaging tools 128 and 129 are moved by a swinging mechanism that consists of a movable plate 136 and an air cylinder 137. The air cylinder 137 is mounted to the base portion 130, and moves the movable plate 136 up and down relative to the base portion 130 by shifting its plunger 137a up and down. The movable plate 136 has a pair of pushing arms 136a and 136b that protrude upward to reach the cam projections 134a, such that the pushing arms 136a and 136b push up the cam projections 134a when the plunger 137a pushes up the movable plate 136. As the cam projections 134a are pushed up, the cam rings 134 and thus the axles 133 rotate.

Figure 17A:
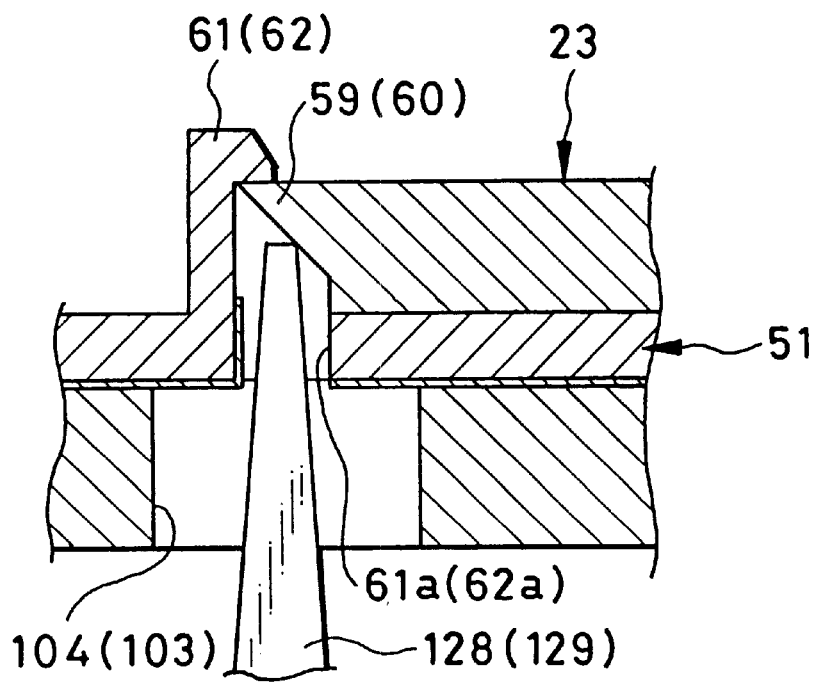
FIGS. 17A and 17B are explanatory diagrams illustrating how the rear cover disengaging mechanism works.

At the third stage S3, the battery chamber lid 45 is opened, and the hooks 61 and 62 of the rear cover section 23 are disengaged from the projections 59 and 60 of the body base portion 18. As shown in FIG. 17A, when the film unit 2 is positioned at the third stage S3, the base portion 130 is moved up, so the disengaging tools 128 and 129 are inserted into the access holes 61a and 62a through the access openings 104 and 103 of the pallet 102. Thereafter, the cam projections 134a are pushed up by the pushing arms 136a and 136b. Thereby, the disengaging tools 128 and 129 swing to break the hooks 61 and 62 of the rear cover section 23, disengaging the rear cover section 23 from the body base portion 18. The forked arm 125 and the disengaging tools 128 and 129 are coated with an anti-adhesion layer to prevent the label members 4 from sticking to them.

Figure 18:
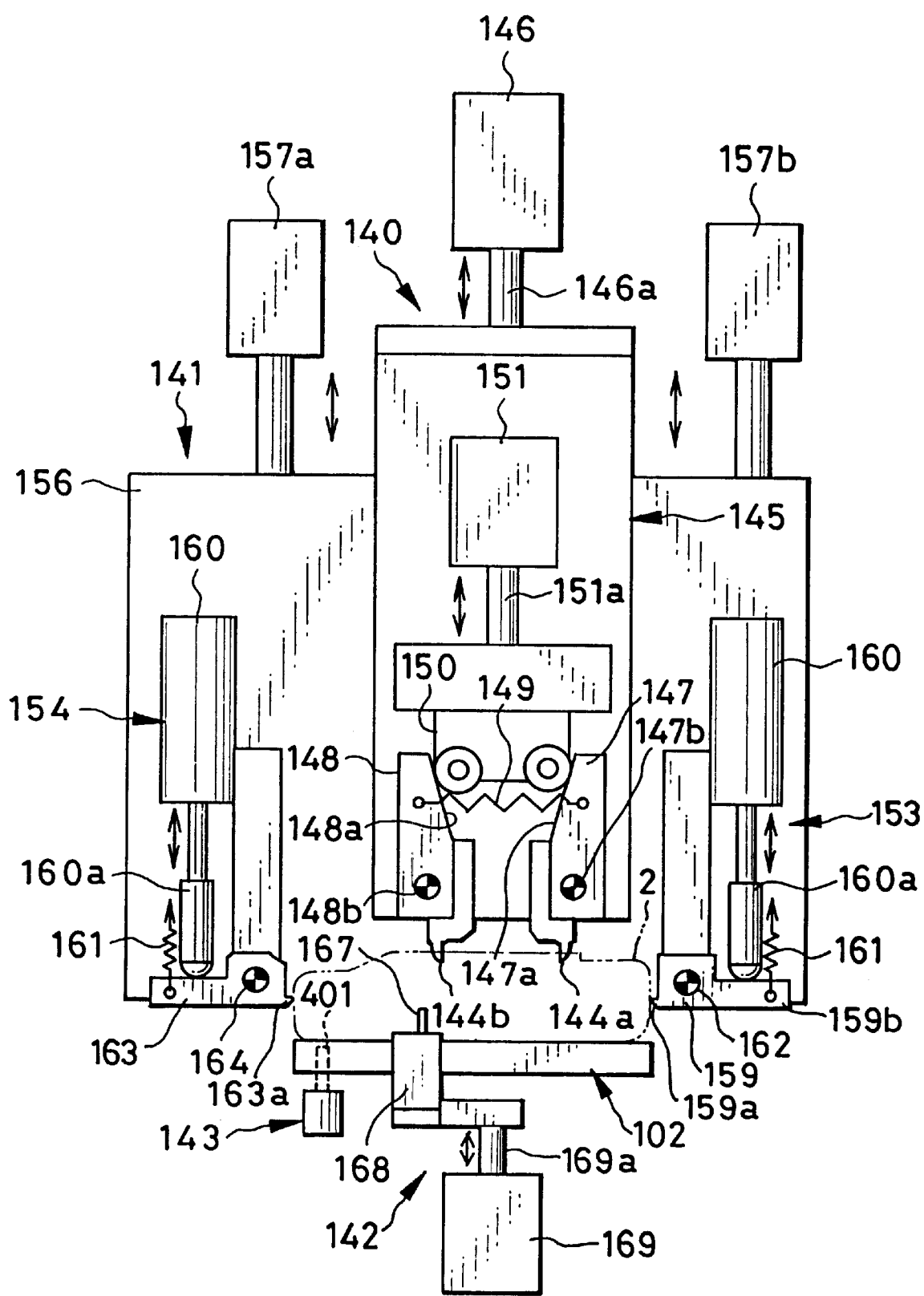
FIG. 18 is a schematic diagram illustrating first to fourth front cover disengaging mechanisms.

At the fourth stage S4, the front cover section 17 is disengaged from both the body base portion 18 and the rear cover section 23. As shown in FIG. 18, a front cover disengaging unit disposed at the fourth stage S4 consists of a first mechanism 140 for disengaging the hooks 75 and 76 of the front cover section 17 from the engaging projections 73 and 74 of the body base portion 18, and a second mechanism 141 for disengaging the claws 71 of the body base portion 18 from the engaging holes 72 of the front cover section 17 are disposed above the pallet 102. Below the pallet 102 is disposed a third mechanism 142 for disengaging the hook 55 of the rear cover section 23 from the engaging hole 57 of the front cover section 17. Also, a fourth mechanism 143 is disposed below the pallet 102 at the fourth stage S4, for disengaging the hook 56 of the rear cover section 23 from the engaging claws 58 that are formed on inside of the top wall of the front cover main body 51 (see FIG. 6).

The first mechanism 140 has a pair of disengaging tools 144a and 144b that are inserted into the access holes 6c and 75a of the front cover section 17, and a swinging mechanism for swinging the disengaging tools 144a and 144b in a direction to close their tips to each other. The swinging mechanism consists of a pair of cam plates 147 and 148 having respective cam surfaces 147a and 148a, a spring 149, a cam member 150 and an air cylinder 151. The cam plates 147 and 148 hold the disengaging tools 144a and 144b respectively, and are mounted to a base plate 145 so as to be pivotal about respective axles 147b and 148b. The base plate 145 is moved up and down by an air cylinder 146. The spring 149 is suspended between the cam plates 147 and 148 to urge them in a direction to move the tips of the disengaging tools 144a and 144b away from each other. The cam member 150 is mounted between the cam plates 147 and 148, and is moved up and down by the air cylinder 151.

Figure 19:
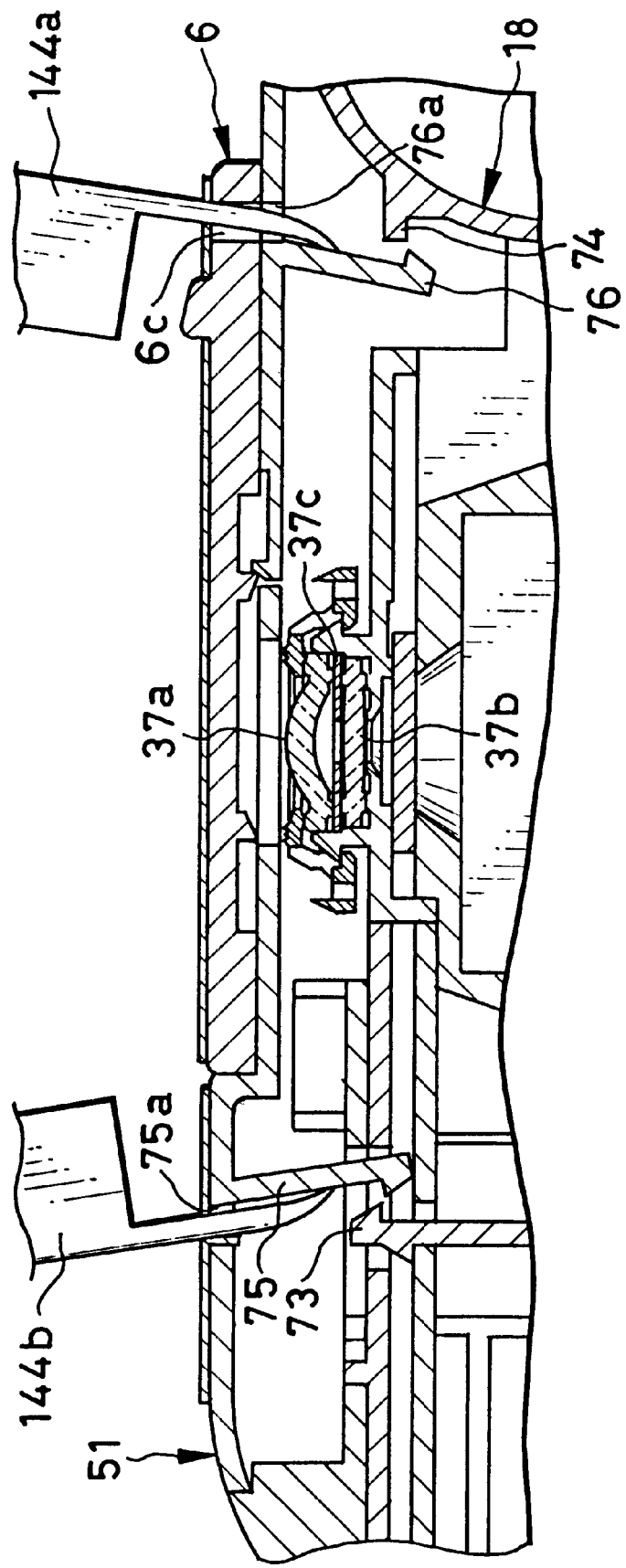
FIG. 19 is an explanatory diagram illustrating how the first front cover disengaging mechanism disengages the front cover section from a body base portion.

The air cylinder 147 is driven to protrude its plunger 147a to move down the base plate 146, and thereby insert the disengaging tools 144a and 144b into the film unit 2 through the access holes 6c and 76a on one hand, and through the access hole 75b on the other hand. After the disengaging tools 144a and 144b reach predetermined positions in the film unit 2, the second air cylinder 151 is driven to protrude its plunger 151a to move down the cam member 150. Then, the cam member 150 pushes the cam surfaces 147a and 148a of the cam plates 147 and 148. Thereby, the upper portions of the cam plates 147 and 148 are moved away from each other against the force of the spring 149. As a result, the tips of the disengaging tools 144a and 144b move closer to each other, and bend the hooks 75 and 76 away from the engaging projections 73 and 74, as shown in FIG. 19.

The second mechanism 141 is constituted of a right side disengaging mechanism 153 and a left side disengaging mechanism 154 disposed on opposite horizontal sides of the film unit 2 that stops at the fourth stage S4, and a base plate 156 holding these disengaging mechanisms 153 and 154, and also a pair of air cylinders 157a and 157b for moving the base plate 156 up and down.

The right side disengaging mechanism 153 is constituted of a disengaging tool 159, an air cylinder 160 for swinging the disengaging tool 159, and a spring 161. The disengaging tool 159 is rotatable about an axis 162, and has an elongated portion 159b on the opposite end from the tip 159a. The spring 161 is suspended between the elongated portion 159b and the base plate 156 so as to urge the disengaging tool 159 in a counterclockwise direction in FIG. 18. The air cylinder 160 pushes down the elongated portion 159b by its plunger 160a, to rotate the disengaging tool 159 in a clockwise direction against the force of the spring 161.

The left side disengaging mechanism 154 fundamentally has the same construction as the right side disengaging mechanism 153, except that a disengaging tool 163 is urged by a spring 161 to rotate in the clockwise direction about an axis 164, and is rotated in the counterclockwise direction by the air cylinder 160.

When the film unit 2 is positioned at the fourth stage S4, the air cylinders 157a and 157b are activated to put tips 159a and 163a of the disengaging tools 159 and 163 at the side joints of the film unit 2 between the front cover section 17 and the rear cover section 23. Thereafter, the air cylinders 160 are activated to rotate the disengaging tools 159 and 163 against the force of the springs 161. Thereby, the tips 159a and 163a of the disengaging tools 159 and 163 push the front cover section 17 off the rear cover section 23 at the side joints of the film unit 2, so that the engaging holes 72 of the front cover section 17 are disengaged from the claws 71 on the body base portion 18.

Figure 20A:
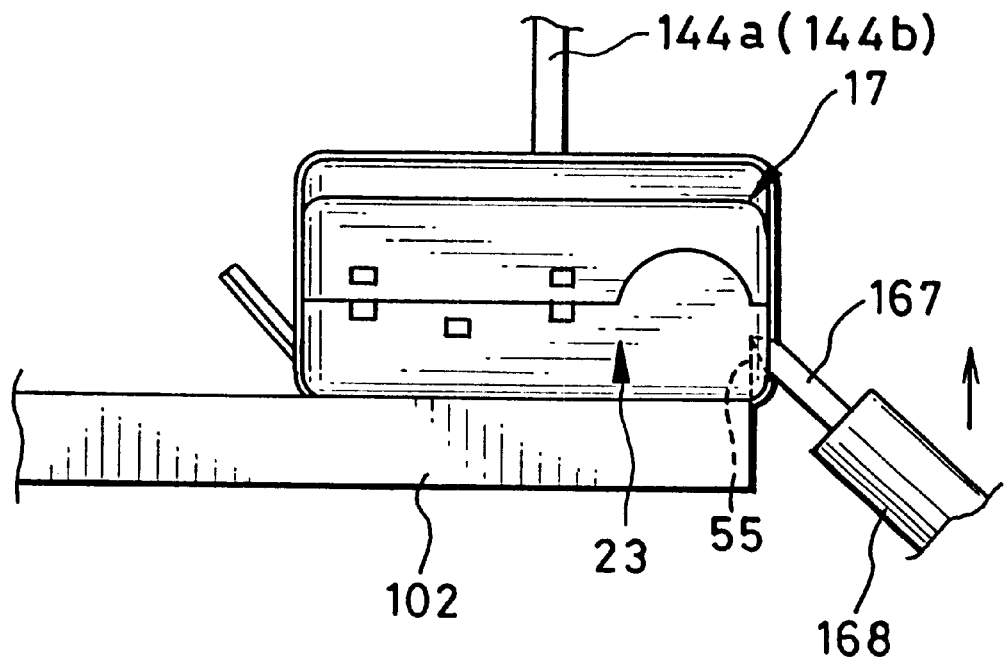
FIGS. 20A and 20B are explanatory diagrams illustrating how the third front cover disengaging mechanism disengages the front cover section from the rear cover section.
Figure 20B:
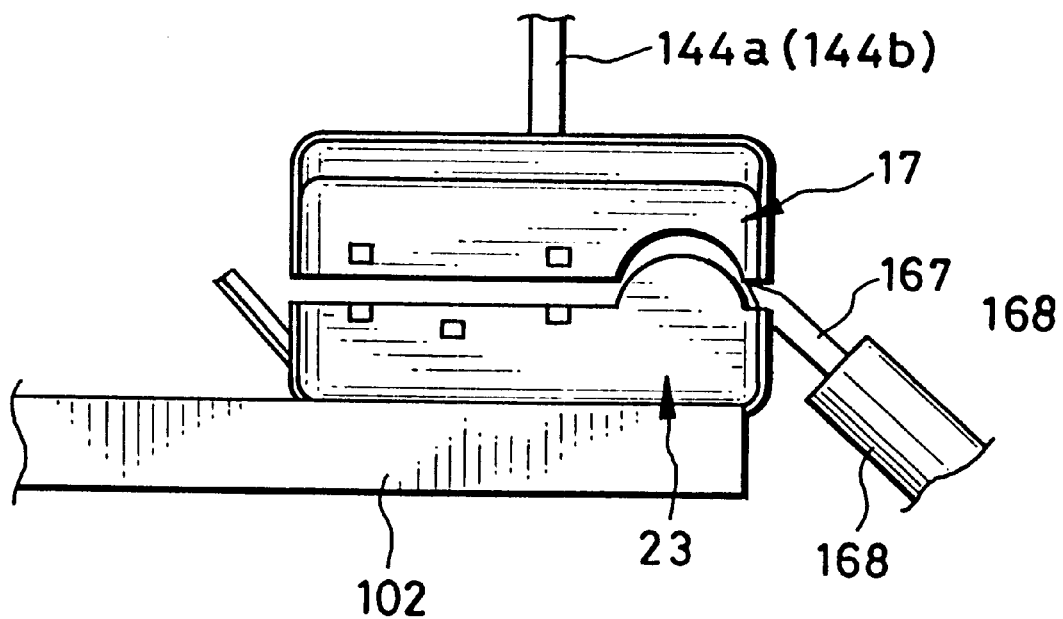

The third mechanism 142 is constituted of a disengaging tool 167, a holding member 168 for holding the disengaging tool 167 and an air cylinder 169 for moving the holding member 168 up and down. The air cylinder 169 is activated to protrude its plunger 169a to lift up the holding member 168. Thereby, the disengaging tool 167 moves up along the hook 55 formed on the top side of the rear cover section 23, and comes to contact with the edge of the front cover section 17, as shown in FIG. 20A. As the holding member 168 is further lifted, the hook 55 is disengaged from the engaging hole 57 of the front cover section 17, as is shown in FIG. 20B. The tools 144a, 144b and 167 are coated with an anti-adhesion layer so as the label members 4 may not adhere to these tools.

Figure 21A:
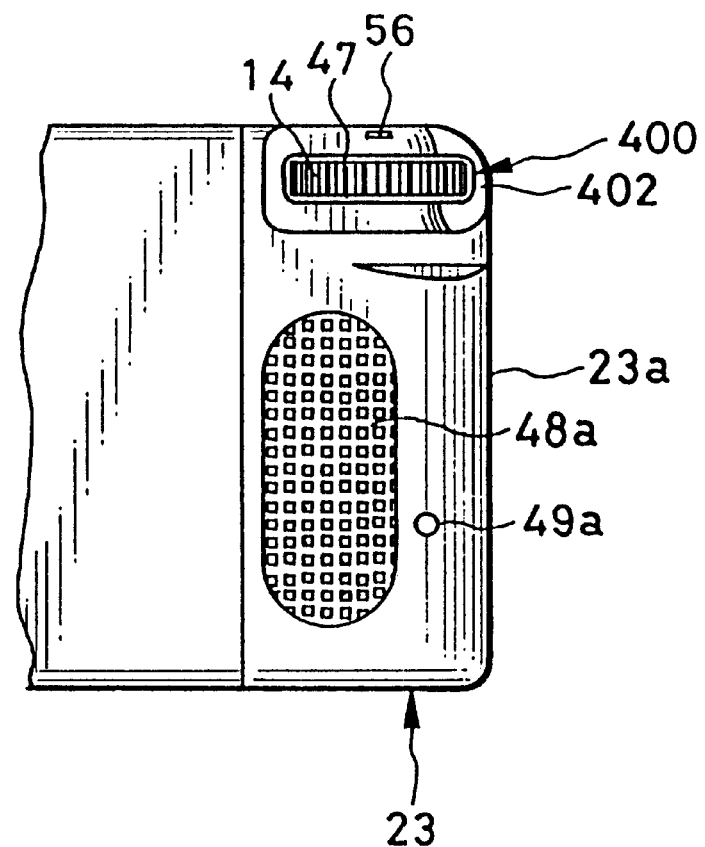
FIGS. 21A and 21B are explanatory diagrams illustrating how the fourth front cover disengaging mechanism releases an internal engaging portion between the front cover section and the rear cover section, which is provided at a position above a film winding wheel.
Figure 21B:
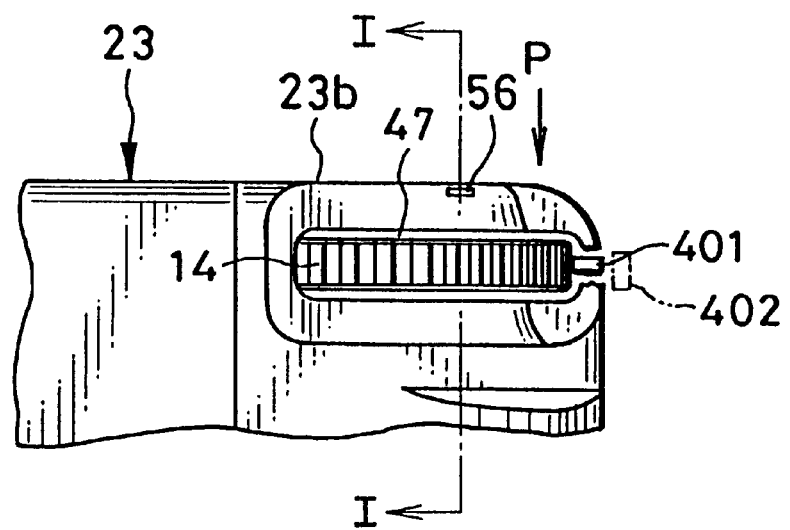

The fourth mechanism 143 consists of a breaking device and a disengaging device. The breaking device inserts a tool 401 into a gap between the film winding wheel 14 and the slot 47 of the rear cover section 23 at a position 400 close to the side wall 23a of the rear cover section 23, as shown in FIG. 21A. Thereafter, the tool 401 is rotated in the gap to break the side wall 23a at a portion 402 beside the position 400, as shown in FIG. 21B (see also FIG. 6). As a result, a top wall portion 23b of the rear cover section 23 above the film winding wheel 14 comes to be bendable by pushing down the top wall portion 23b as shown by an arrow P.

Figure 22A:
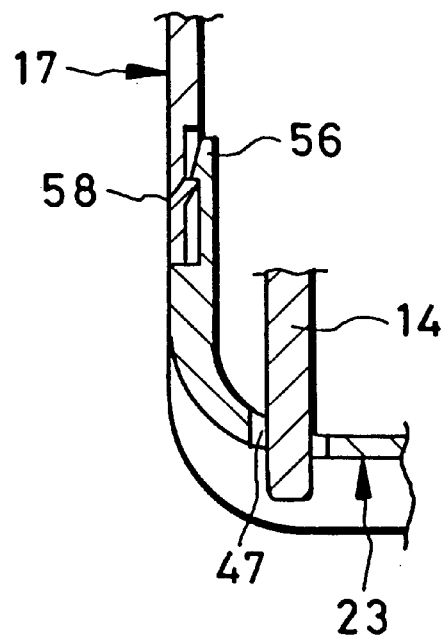
FIGS. 22A and 22B are fragmentary sectional views taken along line I—I in FIG. 21B, illustrating the operation of the fourth front cover disengaging mechanism.
Figure 22B:
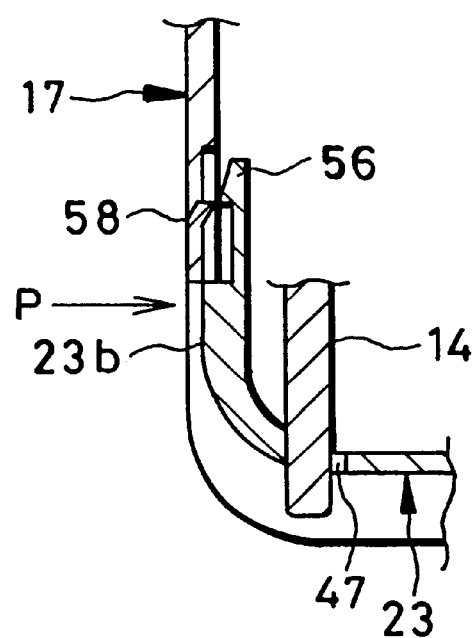

By bending down the top wall portion 32b, the hook 56 is disengaged from the engaging claws 58, as shown in FIGS. 22A and 22B. Therefore, after the breaking device breaks the side wall 23a at the portion 400, the disengaging device pushes down the top wall portion 32b in the direction P, to disengage the hook 56 from the engaging claws 58.

In the fifth stage S5, the front cover section 17 is held by a vacuum suction device 170 and is separated from the body base portion 18, as shown in FIG. 23. The vacuum suction device 170 may be replaced by an air chucking device or other holding device. The separated front cover section 17 is stored in a not-shown recovery box disposed below the fifth stage S5. The recovered front cover section 17, including the lens cover 6, the front cover main body 51, the shutter lock lever 53, the sub label member 79 and a fragment of the main label member 78, are crushed altogether into pellets, and are used as the raw material for forming these elements.

In the seventh stage S7, the switch plate 24 is removed from the body base portion 18, and is conveyed on a conveyer 174 to an appearance inspection process and a cleaning process, for the sake of reusing the switch plate 24. In the eighth stage S8, the supporting plate 25 is removed from the body base portion 18, and is conveyed on a conveyer 176 to an appearance inspection process, for the sake of reusing it.

The ninth stage S9 is to check if the battery 21 is contained in the battery chamber 35 or not, and then check the remaining voltage of the battery 21. In the tenth stage S10, the battery 21 is removed from the battery chamber 35, and is put on a conveyer 180. While being conveyed on the conveyer 180, the battery 21 is sorted according to the remaining voltage, so as to reuse those batteries 21 whose remaining voltage is large enough. In the eleventh stage S11, the flash unit 20 is discharged so that the flash unit 20 may not cause an electric shook later on.

In the twelfth stage S12, it is checked whether the film cartridge 22 remains in the cartridge chamber 31. Also, the flash unit 20 is discharged again to ensure that the flash unit 20 is completely uncharged. In the thirteenth stage S13, the flash unit 20 is separated from the body base portion 18, and conveyed on a conveyer 185 to a performance inspection process and a cleaning process, for the sake of reusing it.

In the fifteenth to eighteenth stages S15 to S18, the lens fastener 38, the front lens 37a, the spacer or stop plate 39, and the rear lens 37b are sequentially removed from the exposure unit 19.

FIG. 24 shows a lens fastener separating device 300 disposed at the fifteenth stage S15. The lens fastener separating device 300 is constituted of a pair of pressing members 301 for pressing the exposure unit 19 and the body base portion 18 onto the pallet 102 to fix the position of the lens fastener 38, a disengaging claw mechanism 302 for disengaging the lens fastener 38 from the lens holder 36 of the exposure unit 19, and an up-down mechanism 303 for moving the pressing member 301 and the disengaging claw mechanism 302 up and down relative to the pallet 102 at the fifteenth stage S15.

The disengaging claw mechanism 302 has a pair of disengaging claws 304 and 305. First, the up-down mechanism 303 moves the disengaging claw mechanism 302 and the pressing members 301 toward the pallet 102. When the pressing members 301 come to press the film unit 2 onto the pallet 102, the disengaging claws 304 and 305 reach the lens fastener 38. Then, the disengaging claw mechanism 302 is activated to move the disengaging claws 304 and 305 away from each other to disengage the snap-in engagement between the lens fastener 38 and the lens holder 36. After disengaging the lens fastener 38 from the lens holder 36, the disengaging claws 304 and 305 keep holding the lens fastener 38 because the direction to hold the lens fastener 38 is equal for the disengaging claws 304 and 305 to the direction to disengage the lens fastener 38 from the lens holder 36. Then, the up-down mechanism 303 lifts the disengaging claw mechanism 302 and the pressing members 301, so the lens fastener 38 is separated from the lens holder 36 and moves up with the disengaging claws 304 and 305.

Although the disengaging claws 304 and 305 not only disengage the lens fastener 38 from the lens holder 36, but also hold and separate the lens fastener 38 from the lens holder 36 in the embodiment shown in FIG. 24, it is possible to provide a disengaging device and a holding device separately, for disengagement and removal of the lens fastener 38 from the lens holder 36.

A front lens removing device disposed at the sixteen stage S16 is constituted of a suction nozzle 310 that is connected to a sucking device through a flexible hose, and a device for moving the suction nozzle 310 relative to the lens holder 36. First, an end 310a of the suction nozzle 310 is positioned close to the front of the front lens 37a, and then the sucking device is activated to suck and hold the front lens 37a onto the end 310a of the suction nozzle 310. Then, the suction nozzle 310, holding the front lens 37a, is moved away from the lens holder 36, thereby to remove the front lens 37a from the lens holder 36. For this purpose, the external diameter of the end 310a of the suction nozzle 310 is defined smaller than the internal diameter of the lens holder 36.

In the sixteenth stage S16, there is also a spacer collection device that consists of a chute 315 and a notshown sucking device connected to the chute 315. After holding the front lens 37a and moving upward from the lens holder 36, the suction nozzle 310 moves horizontally. On the way of this horizontal movement, the chute 315 is inserted under the end 310a of the suction nozzle 310 and, thereafter, the chute 315 moves horizontally along with the suction nozzle 310 while keeping a constant distance from the suction nozzle 310. The sucking device of the spacer collection device has a weaker sucking power than the sucking power of the sucking device of the front lens removing device. Thus, the spacer collection device absorbs the spacer 39 into the chute 315 when the spacer 39 sticks to the front lens 37a that is sucked onto the suction nozzle 310. Also, the chute 315 catches the spacer 39 when it drops off the front lens 37a after being removed together with the front lens 37a from the lens holder 36.

Figure 27:
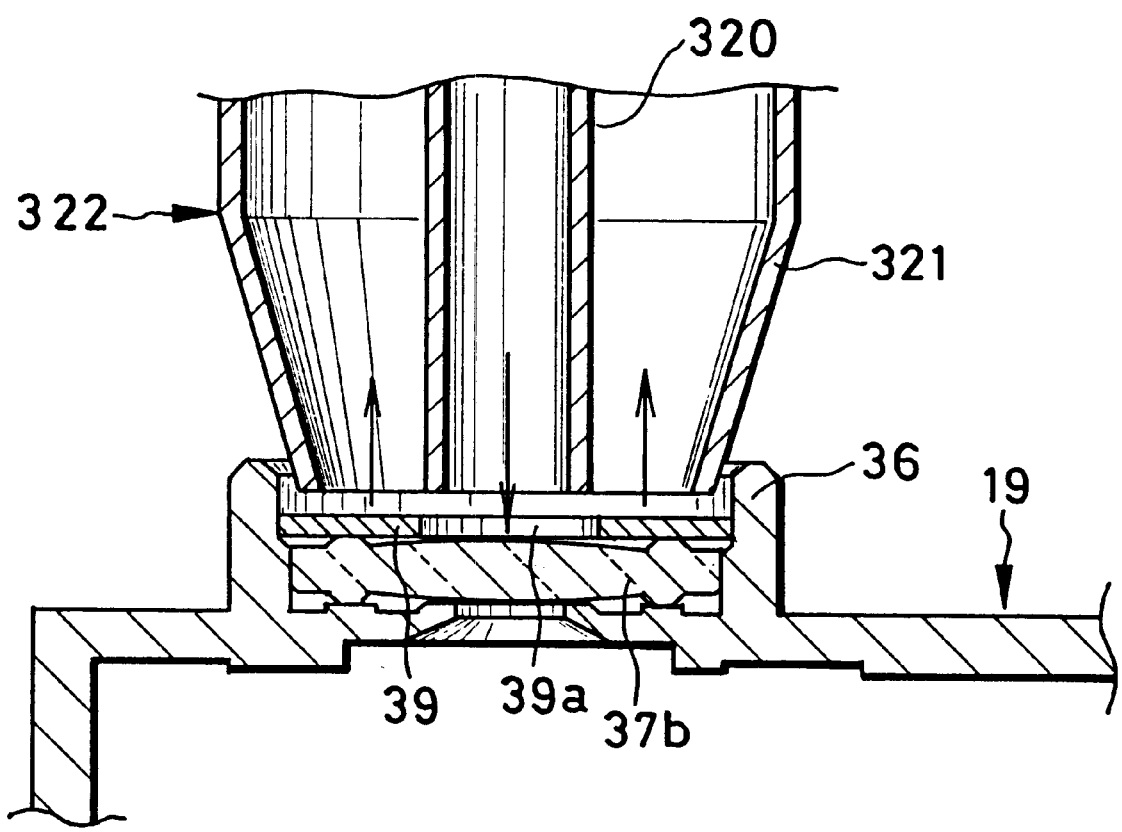
FIG. 27 is a sectional view illustrating how a spacer removing device removes the spacer from the lens holder.

A spacer removing device as shown in FIG. 27 is disposed at the seventeenth stage S17, for removing the spacer 39 out of the lens holder 36 when the spacer 39 remains in the lens holder 36. In order to prevent sucking the rear lens 37b together with the spacer 39, a nozzle 322 of the spacer removing device is divided into an internal tube 320 and an external tube 321, and the internal tube 320 is connected to a blowing device through a flexible hose, whereas the external tube 321 is connected to a sucking device through a flexible hose. The nozzle 322 is moved by a not-shown moving device. The external diameter at the face end of the nozzle 322 is smaller than the internal diameter of the lens holder 36, and the face end of the internal tube 320 is equal to or smaller than the stop aperture 39a in diameter. Where the nozzle 322 is opposed to the lens holder 36, the face end of the internal tube 320 is opposed to the stop aperture 39a. In this position, the blowing device and the sucking device are activated concurrently. Thereby, the spacer 39 is sucked onto the external tube 321, while the rear lens 37b is removed from the spacer 39 by the blows from the internal tube 320.

Although the blowing device and the sucking device connected to the nozzle 322 for sucking the spacer 39 at the seventeenth stage S17 are activated concurrently in the above embodiment, it is possible to activate the blowing device and the sucking device successively. Where a spacer does not has a stop aperture but has an exposure aperture, the air is blown to the rear lens 37b through the exposure aperture.

Figure 25:
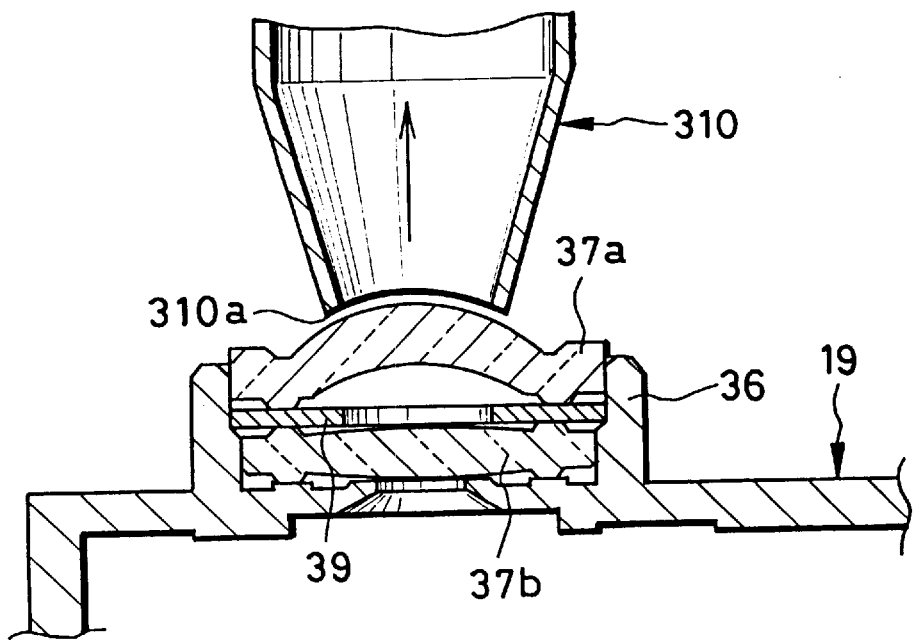
FIG. 25 is a sectional view illustrating how a front lens removing device removes a front lens of the taking lens from the lens holder.

A rear lens removing device disposed at the eighteenth stage S18 has the same construction as the front lens removing device as shown in FIG. 25 that is disposed at the sixteenth stage S16. The rear lens removing device removes the rear lens 37b from the lens holder 36 in the same way as the front lens removing device. The front and rear lenses 37a and 37b are conveyed respectively on conveyers 191 and 192 to an appearance inspection process and a cleaning process, for the sake of reuse them. The lens holder 38 and the spacer 39 are sent to a recycling process to reuse them.

At the twentieth stage S20, the engagement between the engaging holes 64 and 68 of the rear cover 23, on one hand, and the hooks 63 and 66 of the body base portion 18, on the other hand, is released to disengage the rear cover 23 from the body base portion 18. At the twenty-first stage S21, the body base portion 18 with the exposure unit 19 and the door closing mechanism thereon is removed from the rear cover section 23, and is put on a conveyer 196. While being conveyed on the conveyer 196, the shutter button 13 is removed from the exposure unit 19 by a separating device 197, and then the light-guide 11 and the film winding wheel 14 are removed from the body base portion 18 by a separating device 198. Thereafter, the body base portion 18 is reused after passing through performance inspections of the exposure unit 19 and the door closing mechanism.

At the twenty-second stage S22, a not-shown photographic imaging and image processing device inspects for any dusts and dirts on the rear cover section 23. At the twenty-third stage S23, the rear cover section 23 is taken out from the pallet 102, and are stored in a not-shown recovery box disposed below that stage S23. The rear cover section 23 with a fragment of the main label member 78 attached thereto is crushed into pellets for use as the material for forming rear covers 23. At the twenty-fourth stage S24, the pallet 102 is dusted by a not-shown vacuum cleaner or the like.

Now the overall operation and effects of the disassembling apparatus will briefly be described.

While being conveyed on the conveyer 81, the used film unit 2 is inspected by the work inspecting section 83, and those film units 2 having some external defects, those conveyed in a wrong posture, those of different types, and those with their lens covers 6 open are ejected from the conveyer 81 in the disqualified work ejecting section 84.

Thereafter, the laser markers 85b and 85a in the label cutting section 85 cut the main label member 78 respectively along the cutting lines 94 to 97 at the top and bottom sides of the unit body 3, as shown in FIGS. 9 to 11. Cutting the label members 4 in this way makes the unit body 3 ready for being disassembled more quickly at a lower cost than peeling the label members 4. Thus, the operation efficiency of the disassembling apparatus is improved.

The film unit 2 is then picked up from the conveyer 81 and placed on the pallet 102 at the first stage S1 of the turn table 82, with its front side oriented upward as shown in FIG. 12. The pallet 102 carrying the film unit 2 thereon is shifted from the first stage S1 to the second stage S2 by the stepwise rotation of the turn table 82.

At the second stage S2, the upper mechanism 108 and the lower mechanism 109 are activated simultaneously when the pallet 102 carrying the film unit 2 is set in the position as shown in FIG. 13. Thereby, the work holding arms 114 hold the film unit 2 onto the pallet 102, and the piercing tools 110 and 111 thrust through the sub label member 79 to provide holes in connection to the access hole 6c and 76a as well as the access hole 75a. Simultaneously, the piercing tools 116 and 117 are moved up into the access openings 103 and 104 of the pallet 102, and thrust through the main label member 78 to provide holes in connection to the access holes 61a and 62a of the rear cover section 23.

Figure 16B:
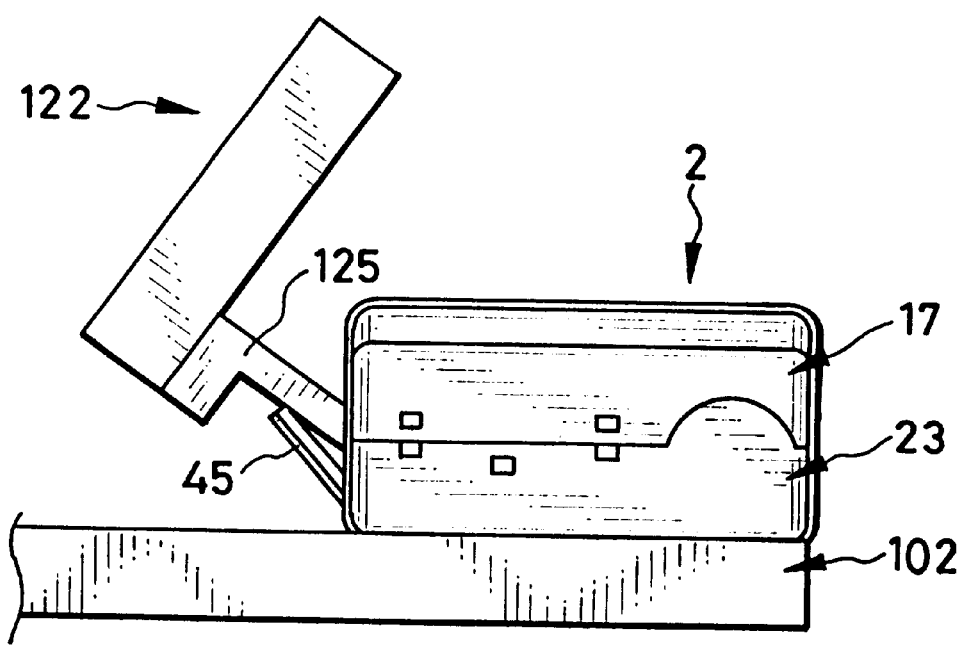

When the film unit 2 is positioned at the third stage S3, the battery chamber lid opening mechanism 122 is activated to put the forked arm 125 onto the edge of the battery chamber lid 45, and push down the battery chamber lid 45 by the forked arm 125, as shown in FIG. 16A. Thereby, the battery chamber lid 45 is bent along the groove 45a to open the battery chamber 35, as shown in FIG. 16B.

Figure 17B:
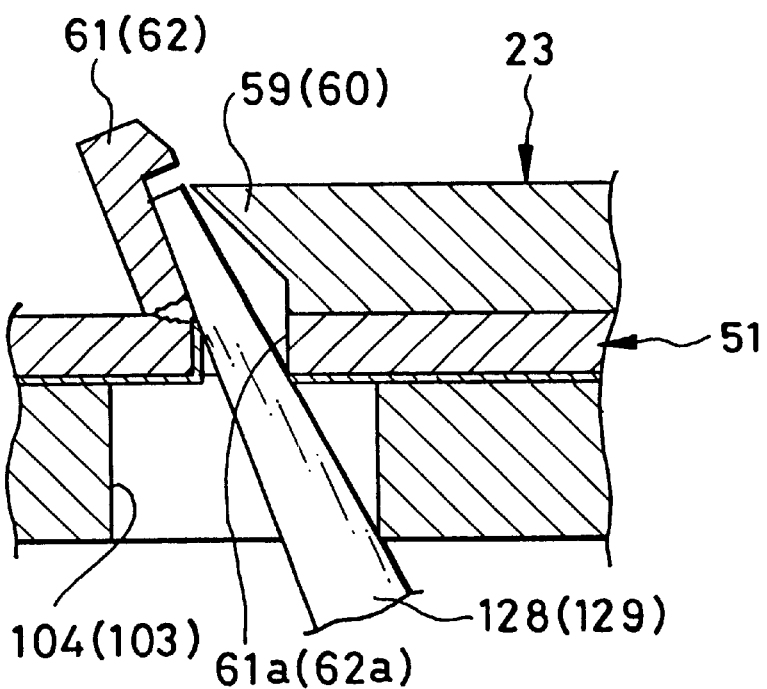

At the third stage S3, also the rear cover disengaging mechanism 123 is activated simultaneously with the battery chamber lid opening mechanism 122. Thereby, the disengaging tools 128 and 129 are inserted into the access holes 61a and 62a of the rear cover section 23 through the access openings 104 and 103 of the pallet 102 respectively. Thereafter, the air cylinder 137 is activated to push up the cam projections 134a by the pushing arms 136a and 136b. Thereby, the disengaging tools 128 and 129 are inclined in the direction to bend the hooks 61 and 62 off the engaging projections 59 and 60, as shown in FIG. 17B.

When the film unit 2 is positioned at the fourth stage S4, the air cylinder 147 of the first mechanism 140 of the front cover disengaging unit is driven to move the base plate 146 downward and insert the disengaging tool 144a into the film unit 2 through the access holes 6c and 76a, and the disengaging tool 144b through the access hole 75b. After the disengaging tools 144a and 144b reach predetermined positions in the film unit 2, the second air cylinder 151 of the first mechanism 140 is driven to move down the cam member 150. Then, the cam member 150 pushes the cam surfaces 147a and 148a of the cam plates 147 and 148, shifting the upper portion of the cam plates 147 and 148 away from each other against the force of the spring 149. As a result, the tips of the disengaging tools 144a and 144b move closer to each other, and bend the hooks 75 and 76 off the engaging projections 73 and 74, as shown in FIG. 19.

Simultaneously with the first mechanism 140, the air cylinders 157a and 157b of the second mechanism 141 are activated to position the tips 159a and 163a of the disengaging tools 159 and 163 at the side joints of the film unit 2 between the front cover section 17 and the rear cover section 23. Thereafter, the air cylinders 160 are activated to rotate the disengaging tools 159 and 163 against the force of the springs 161. Thereby, the tips 159a and 163a of the disengaging tools 159 and 163 push the front cover section 17 off the rear cover section 23 at the side joints of the film unit 2, so the engaging holes 72 of the front cover section 17 are disengaged from the claws 71 on the body base portion 18.

Simultaneously with the first and second mechanism 140 and 142, the third mechanism 142 is activated to move up the disengaging tool 167 along the hook 55 formed on the top side of the rear cover section 23, and bring the disengaging tool 167 into contact with the edge of the front cover section 17, as shown in FIG. 20A. As the disengaging tool 167 is further lifted, the hook 55 is disengaged from the engaging hole 57 of the front cover section 17, as is shown in FIG. 20B.

The fourth mechanism 143 is activated simultaneously with the first to third mechanisms 140 to 142. Then, the tool 401 is inserted into the gap between the film winding wheel 14 and the slot 47 of the rear cover section 23 at the position 400 close to the side wall 23a of the rear cover section 23, as shown in FIG. 21A. Next, the tool 401 is rotated in the gap to break the side wall 23a at the portion 402 near the film winding wheel 14, as shown in FIG. 21B (see also FIG. 6). It is alternatively possible to break the side wall portion 402 by twisting or inclining the tool. Thereafter, the top wall portion 23b of the rear cover section 23 above the film winding wheel 14 is pushed in the direction shown by the arrow P, so the hook 56 is disengaged from the engaging claws 58, as shown in FIGS. 22A and 22B.

In the fifth stage S5, the front cover section 17, including the lens cover 6, the front cover main body 51, the shutter lock lever 53, the sub label member 79 and a fragment of the main label member 78, is separated from the body base portion 18 by the vacuum suction device 170, as shown in FIG. 23, and is crushed altogether into pellets, for use as the raw material. Since there is no need for disassembling the front cover section 17 itself to separate it from the body base portion 18 and recycle it as the raw material, the efficiency is improved and the cost is lowered.

Thereafter, the switch plate 24, the supporting plate 25, the battery 21, and the flash unit 20 are sequentially removed from the body base portion at the seventh to thirteenth stages S7 to S13.

Figure 26:
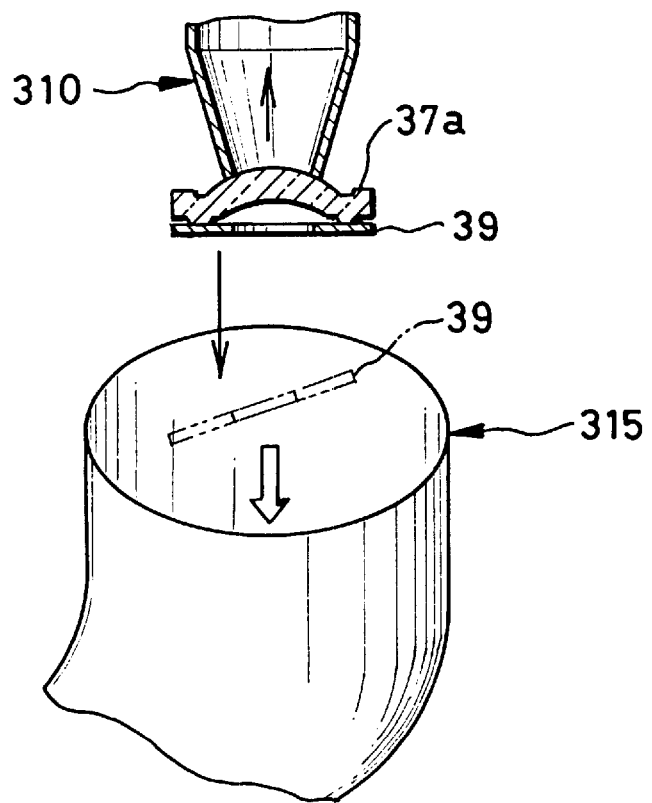
FIG. 26 is an explanatory diagram illustrating how a spacer removed along with the front lens from the lens holder is collected separately.

At the fifteenth stage S15, the lens fastener 38 is removed from the lens holder 36 of the exposure unit 19 by the lens fastener separating device 300 as shown in FIG. 24. At the sixteenth stage S16, the front lens 37a is removed from the lens holder 36 by use of the suction nozzle 310, as shown in FIG. 25. If the spacer 39 is removed together with the front lens 37a from the lens holder 36 at this stage S16, the spacer 39 is recovered by the chute 315, as shown in FIG. 26. At the seventeenth and eighteenth stages S17 and S18, the spacer 39 and the rear lens 37b are sequentially removed from the lens holder 36. The front and rear lenses 37a and 37b are respectively collected in recovery boxes through the conveyers 191 and 192, and are reused after passing through the appearance inspections and the cleaning process. The lens holder 38 and the spacer 39 are recycled as the raw material.

At the twentieth stage S20, the body base portion 18 is disengaged from the rear cover section 23. At the twenty-first stage S21, the body base portion 18 with the exposure unit 19 and the door closing mechanism thereon is removed from the rear cover section 23, and is put on the conveyor 196. While being conveyed on the conveyor 196, the shutter button 13 is removed from the exposure unit 19, and the light guide 11 and the film winding wheel 14 are removed from the body base portion 18. Thereafter, the body base portion 18 is reused after passing through performance inspections of the exposure unit 19 and the door closing mechanism.

At the twenty-second stage S22, the rear cover section 23 is inspected for any dusts. At the twenty-third stage S23, the rear cover section 23 is taken out from the pallet 102, and are collected in the recovery box. The rear cover section 23 is crushed into pellets together with the main label member 78 attached thereto, and used as the material for forming rear covers 23. In the twenty-fourth stage S24, the pallet 102 is cleaned.

Figure 28A:
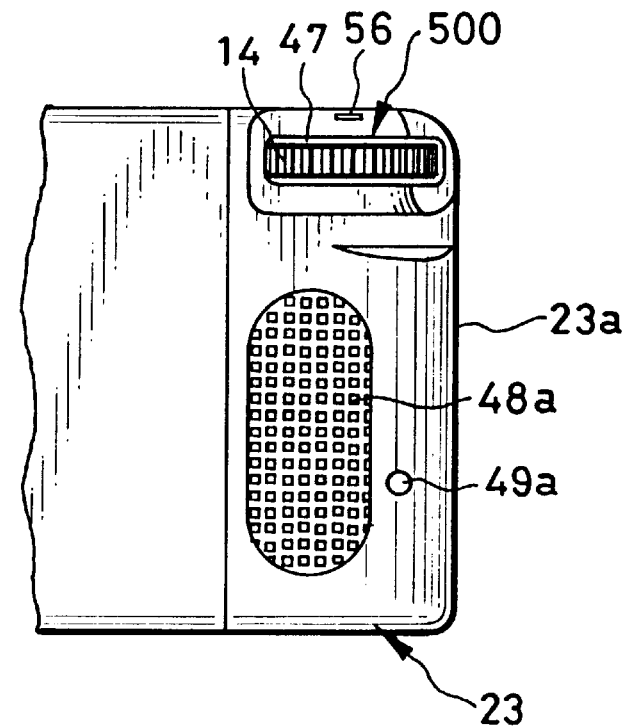
FIGS. 28A and 28B are explanatory diagrams illustrating a second method of releasing the internal engaging portion between the front cover section and the rear cover section provided above the film winding wheel.
Figure 28B:
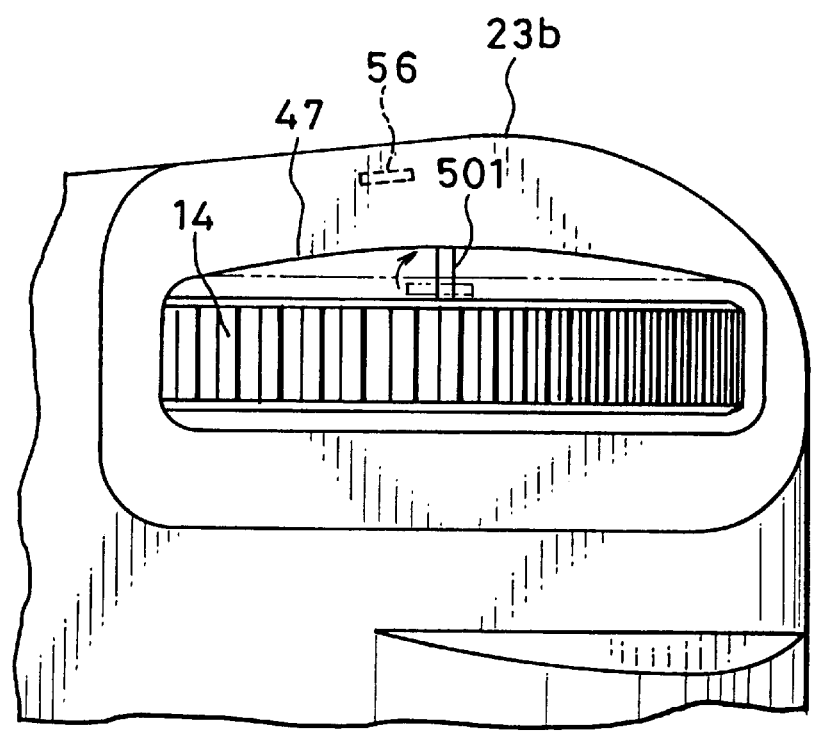
Figure 29:
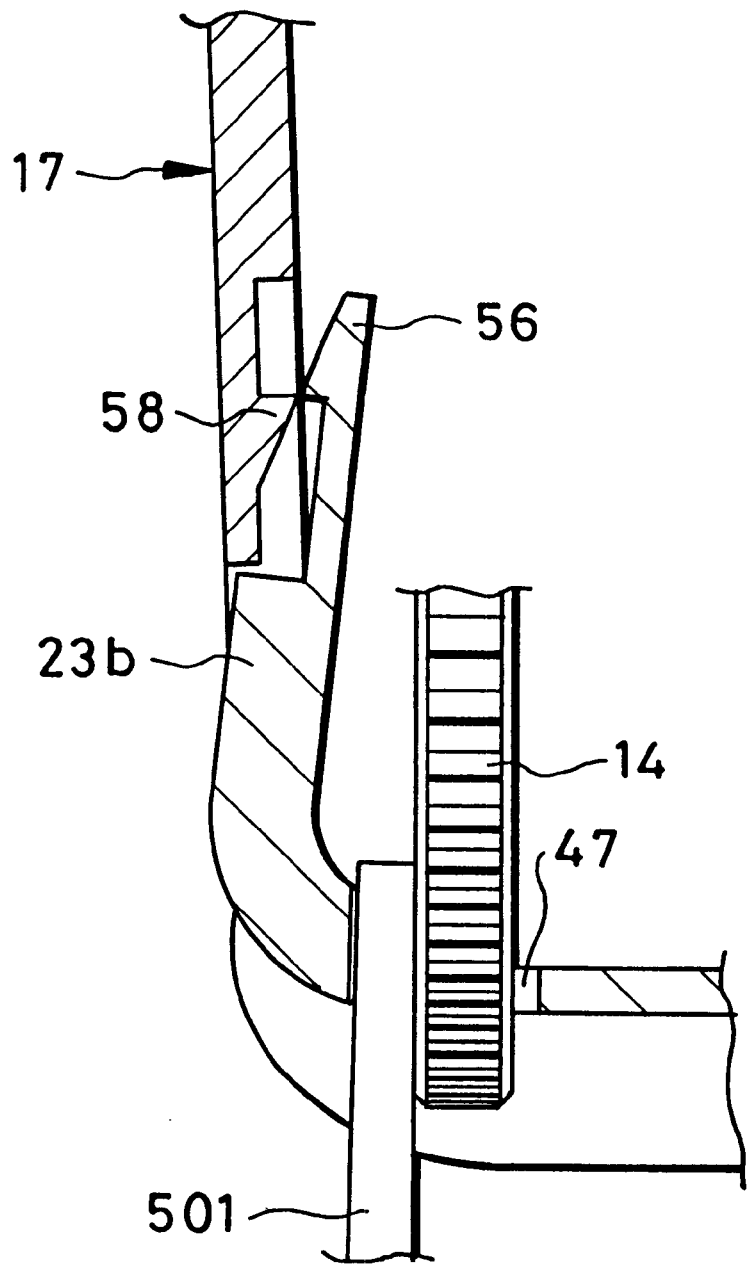
FIG. 29 is a fragmentary sectional view illustrating a position corresponding to FIG. 28A, where the engagement above the film winding wheel is released.

FIGS. 28A, 28B and 29 shows another method of disengaging the hook 56 from the engaging claws 58. That is, instead of the method as set forth above with reference to FIGS. 21A to 22B, a disengaging tool 501 is inserted into the gap 47 at a position 500 above the film winding wheel 14, and then rotated to push up the top wall portion 23b above the film winding wheel 14, as shown FIG. 28B. Since a base portion of the hook 56 is pushed up at that time, as shown in FIG. 29, the hook 56 is disengaged from the engaging claws 58.

The tool 501 may be twisted or inclined at the position 500 in the gap 47 for the disengagement of the hook 56. It may be possible to insert the tool 501 through a gap formed around the shutter button 13 to disengage the hook 56 from the engaging claws 58. The position or shape of the hook 56 and the engaging claws 58 may be modified appropriately. For example, the rear cover section 23 may have engaging claws on an inner surface above the film winding wheel 47, and the front cover section 17 may have a hook in correspondence with the engaging claws on the rear cover section 23.

Figure 30:
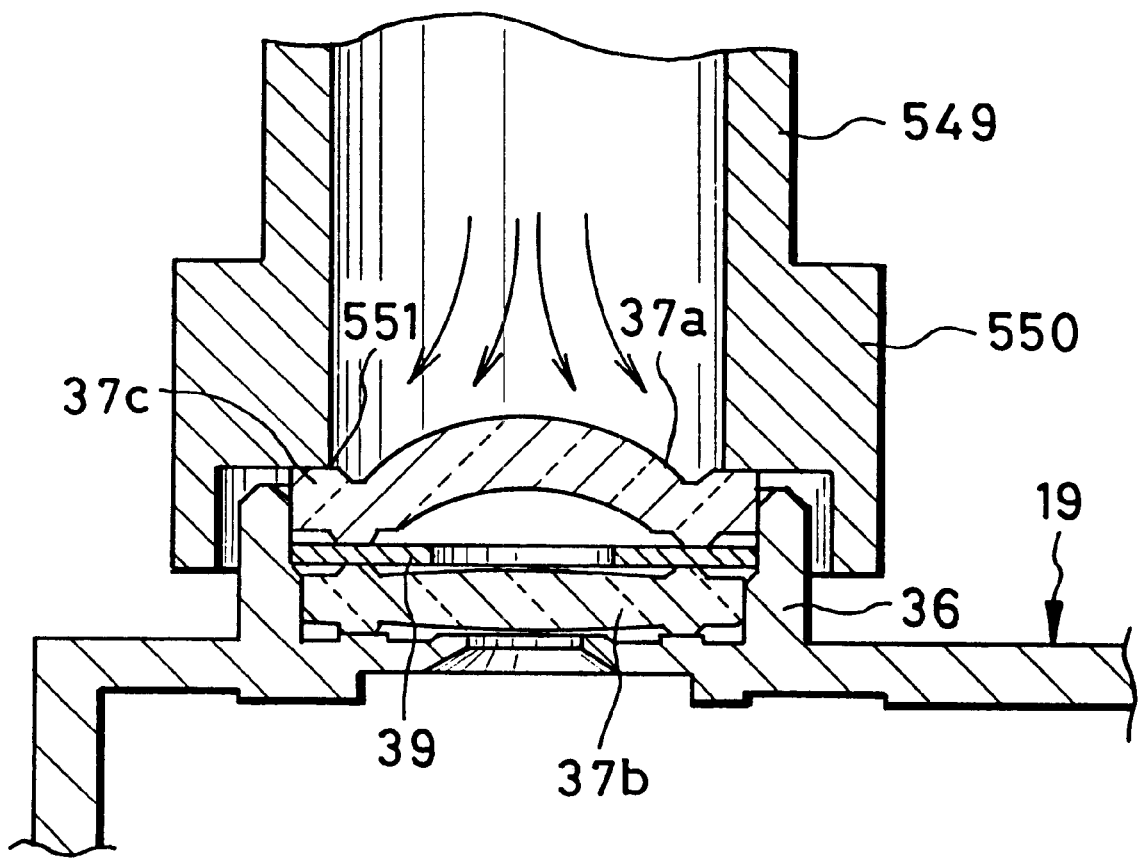
FIG. 30 is a fragmentary sectional view illustrating an anti-static cleaner that eliminates static electricity from the lens elements of the taking lens.

It is preferable to provide an anti-static cleaner behind the disengaging claw mechanism 302 of the lens fastener separating device 300, in order to avoid electro-static adsorption between the front and rear lenses 37a and 37b and the spacer 39 in the following removing processes. As shown in FIG. 30, the anti-static cleaner has a hose 549 movable up and down relative to the exposure unit 19 of the film unit 2 on the pallet 102, and a hood 550 provided at a face end of the hose 549. After covering the front and periphery of the lens holder 36 with the hood 550, the anti-static cleaner blows anti-static air from the hose 549 into the lens holder 36 to eliminate static electricity from the front and rear lenses 37a and 37b and the spacer 39.

To prevent blowing the front lens 37a out of the lens holder 36, a pressing rim 551 is provided inside the hood 550 to hold the front lens 37a at its flange 37c. The pressure of the pressing rim 551 onto the front lens 37a is defined such that small gaps are provided between the front and rear lenses 37a and 37b and the spacer 39 for allowing the anti-static air to enter.

Figure 31:
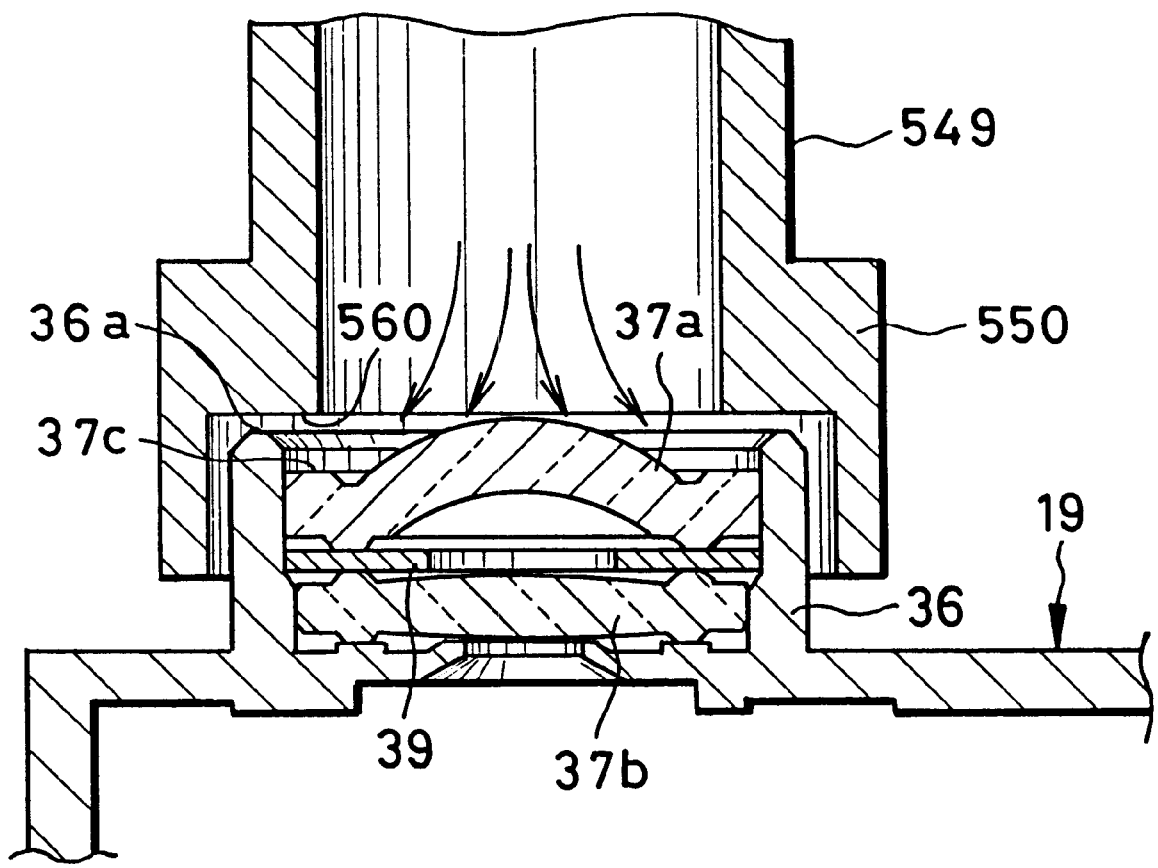
FIG. 31 is a fragmentary sectional view illustrating another embodiment of anti-static cleaner for the taking lens.

Instead of the pressing rim 551, it is possible to provide a stopper portion 560 that protrudes inward the hood 550, as shown in FIG. 31. The stopper portion 560 is opposed to but spaced from the flange 37c of the front lens 37a by such an amount that the stopped portion 560 stops the front lens 37a as well as the spacer 38 and the rear lens 37b from being blown out of the lens holder 36 or tumbled inside the lens holder 36 due to the anti-static air. By providing the space between the stopper portion 560 and the front lens 37a, the anti-static air can smoothly enter between the front and rear lenses 37a and 37b and the spacer 39. The stopper portion 560 may contact with an upper rim 36a of the lens holder 36, or may be slightly spaced from the upper rim 36a. It is also possible to provide partial spacings between the upper rim 36a of the lens holder 36 and the stopper portion 560.

Although the present invention has been described with respect to the embodiments shown in the drawings, the present invention is not limited to the shown embodiments. For example, the present invention is applicable to a film unit that does not have a lens cover. It is possible to separate the exposure unit from the body base portion, and then remove the lens elements of the taking lens from the exposure unit. Although the lens fastener is a separate part in the drawings, it is possible to form a lens fastener integrally on a front cover section.

Thus, various modifications may be possible to those skilled in the art without departing from the scope of appended claims.

What is claimed is:

1. A method of disassembling a film unit that comprises a body base portion having photographic mechanisms incorporated therein, front and rear cover sections removably attached to front and rear sides of the body base portion and joined together to cover up the body base portion, and a label member put across a joint between the front and rear cover sections, the method comprising:

cutting the label member along the joint between the front and rear cover sections; and separating the front or the rear cover section from the body base portion without removing the label member from the front or the rear cover section.

2. A method as claimed in claim 1, wherein laser beams are used for cutting the label member.

3. A. method as claimed in claim 2, wherein the cutting step comprises the steps of:

conveying the film unit in a predetermined posture along a conveying path such that a portion of the label member extending on the joint is directed to one side of the conveying path; and projecting the laser beams toward the portion of the label member extending on the joint of the film unit on the conveying path.

4. A method as claimed in claim 1, wherein the film unit has at least an engaging portion located at the joint to engage the front cover section with the rear cover section, and covered with the label member, the method further comprising the steps of cutting the label member at portions corresponding to the engaging portion so that a disengaging tool can access the engaging portion without removing the label member.

5. A method as claimed in claim 1, wherein the film unit has internal engaging portions located inside the film unit to engage the front or the rear cover section with the body base portion, and access holes are provided through the front or the rear cover section to permit accessing the internal engaging portions, the access holes being covered up with the label member, the method further comprising the steps of:
   piercing holes through the label member in connection to the access holes; and
   inserting disengaging tools into the access holes through the holes of the label member, to disengage the internal engaging portions before the separating step.

6. A method as claimed in claim 1, wherein the label member is made of the same plastic material as the front and rear cover sections, and is crushed together with the front and rear cover sections into pellets to reuse as a raw material.

7. An apparatus for disassembling a film unit that comprises a body base portion having photographic mechanisms incorporated therein, front and rear cover sections removably attached to front and rear sides of the body base portion and joined together to cover up the body base portion, and a label member put across a joint between the front and rear cover sections, the apparatus comprising:
   a cutting device for cutting the label member along the joint between the front and rear cover sections; and
   a separating device for separating the front or the rear cover section from the body base portion without removing the label member from the front or the rear cover section.

8. An apparatus as claimed in claim 7, further comprising a conveyer device for conveying the film unit in a predetermined posture along a conveying path such that a portion of the label member extending on the joint between the front and rear cover sections is directed to one side of the conveying path, wherein the cutting device comprises a laser marker disposed on the one side of the conveying path, the laser marker projecting laser beams toward the portion of the label member extending on the joint of the film unit on the conveying path.

9. An apparatus as claimed in claim 7, wherein the film unit has internal engaging portions located inside the film unit between the front and rear cover sections and the body base portion, and access holes provided through the front and rear cover sections to permit accessing the internal engaging portions, the access holes being covered up with the label member, and wherein the apparatus further comprises:
   a device for piercing holes through the label member that connect to the access holes; and
   a device for inserting disengaging tools into the access holes through the holes of the label member in order to disengage the internal engaging portions.

10. A method of disassembling a film unit that comprises a body base portion having photographic mechanisms incorporated therein, and front and rear cover sections removably attached to front and rear sides of the body base portion, the front cover section having a lens cover that is mounted on a front cover main body so as to be movable between a closed position covering a taking lens and an open position uncovering the taking lens, the method comprising the steps of:
   providing first and second access holes respectively through the lens cover and the front cover main body when manufacturing them, such that the first and second access holes overlap each other in the closed position of the lens cover, the overlapping holes providing an access to an internal engaging portion between the front cover section and the body base portion;
   inserting a tool into the first and second access holes, to disengage the internal engaging portion between the front cover section and the body base portion; and
   separating the front cover section from the body base portion without separating the lens cover from the front cover main body.

11. A method as claimed in claim 10, wherein the first access hole is covered with a label member that is put on a front surface of the lens cover, and the method further comprises the step of piercing a hole through the label member in order to connect to the first access hole, before inserting the tool into the first and second access holes, so that the front cover section may be separated from the body base portion without removing the label member from the lens cover.

12. A method as claimed in claim 11, wherein the label member, the lens cover and the front cover main body are made of the same plastic material, and are crushed altogether into pellets to reuse.

13. An apparatus for disassembling a film unit that comprises a body base portion having photographic mechanisms incorporated therein, and front and rear cover sections removably attached to front and rear sides of the body base portion, the front cover section having a lens cover that is mounted on a front cover main body so as to be movable between a closed position covering a taking lens and an open position uncovering the taking lens, and first and second access holes being formed respectively through the lens cover and the front cover main body such that the first and second access holes overlap each other in the closed position of the lens cover, to permit accessing an internal engaging portion between the front cover section and the body base portion, the apparatus comprising:
   a device for inserting a tool into the first and second access holes, to disengage the front cover section from the body base portion; and
   a device for separating the front cover section from the body base portion without separating the lens cover from the front cover main body.

14. An apparatus as claimed in claim 13, wherein the first access hole is covered with a label member that is put on a front surface of the lens cover, and the apparatus further comprises a device for piercing a hole through the label member in connection to the first access hole, before inserting the tool into the first and second access holes.

15. A method of disassembling a film unit whose housing consists of at least two sections which are removably joined together through at least an engagement between an internal hook formed on a first one of the at least two sections and a counterpart formed on a second one of the at least two sections, the internal hook being located inside the film unit in proximity to an opening formed through the first section for the sake of exposing an operational member operated for photography, the method comprising:
   positioning the film unit in a predetermined posture at a disassembling stage;
   inserting a tool into a gap between the opening and the operational member;
   breaking through a portion of the first section with the tool to connect the gap to outside the film unit, thereby making the first section bendable in an area of the first section around the internal hook;

pushing the area of the first section around the internal hook in order to disengage the internal hook from the counterpart; and thereafter separating the first and second sections from each other.

16. A method of disassembling a film unit whose housing consists of at least two sections which are removably joined together through at least an engagement between an internal hook formed on a first one of the at least two sections and a counterpart formed on a second one of the at least two sections, the internal hook being located inside the film unit in proximity to an opening formed through the first section for the sake of exposing an operational member operated for photography, the method comprising the steps of:

positioning the film unit in a predetermined posture at a disassembling stage;

inserting a tool into a gap between the opening and the operational member;

deforming by the tool an area of the first section around the internal hook in a direction to disengage the internal hook from the counterpart; and thereafter separating the first and second sections from each other.

17. An apparatus of disassembling a film unit having a taking lens that consists of a front lens, a rear lens and a spacer disposed between the front and rear lenses, the spacer having an aperture at its center, wherein the front and rear lenses and the spacer are held in a lens holder and secured therein by a lens fastener that is fitted to a front of the lens holder though a snap-in engagement, the apparatus comprises:

a positioning device for positioning the film unit in a posture where the taking lens is oriented upward;

a first suction nozzle being moved in the lens holder after the lens fastener is separated from the lens holder, to suck the front lens onto its face end, and then moved away from the lens holder to remove the front lens from the lens holder;

a nozzle consisting of an internal tube that functions as an air jet nozzle and an external tube that surrounds the internal tube and functions as a suction nozzle, the nozzle being moved in the lens holder after the front lens is removed, to suck the spacer onto a face end of the external tube, and then moved away from the lens holder to remove the spacer from the lens holder, while the air is blown out from the internal tube to remove the rear lens from the spacer; and a second suction nozzle being moved in the lens holder after the spacer is removed, to suck the rear lens onto a face end of the second suction nozzle, and then moved away from the lens holder to remove the rear lens from the lens holder.

18. An apparatus as claimed in claim 17, wherein the face ends of the first and second suction nozzles have a smaller external diameter than an internal diameter of the lens holder.

19. An apparatus as claimed in claim 17, wherein the face end of the nozzle has a smaller external diameter than the internal diameter of the lens holder, and the face end of the internal tube has a diameter that is equal to or smaller than a diameter of the aperture of the spacer.

20. An apparatus as claimed in claim 17, further comprising a lens fastener separating device having a disengaging claw mechanism with a pair of disengaging claws, wherein the disengaging claws are inserted into between the lens fastener and the lens holder, and moved to disengage the lens fastener from the lens holder, and then moved away from the lens holder while keeping holding the lens fastener, to separate the lens fastener from the lens holder.

21. An apparatus as claimed in claim 17, further comprising a chute connected to a suction device, the chute being inserted under the first suction nozzle after the first suction nozzle is moved away from the lens holder to remove the front lens, the suction device connected to the chute having a weaker sucking power than the first suction nozzle such that if the spacer is removed along with the front lens from the lens holder, only the spacer is sucked into the chute.

22. An apparatus as claimed in claim 17, further comprising an anti-static cleaner for blowing anti-static air into the lens holder to eliminate anti-static electricity from the front and rear lenses and the spacer, the anti-static cleaner being put on the front of the lens holder and activated, after the lens fastener is removed and before the first suction nozzle is moved in the lens holder.

23. An apparatus as claimed in claim 22, wherein the anti-static cleaner comprises a hood for covering the front and periphery of the lens holder, and a stopper member formed inside the hood to prevent the front and rear lenses and the spacer from being blown out of the lens holder or tumbled inside the lens holder.

* * * * *